United States Patent
Zhang et al.

(10) Patent No.: US 12,356,390 B2
(45) Date of Patent: Jul. 8, 2025

(54) TECHNIQUES FOR SCHEDULING FULL-DUPLEX COMMUNICATIONS

(71) Applicant: QUALCOMM Incorporated, San Diego, CA (US)

(72) Inventors: Qian Zhang, Basking Ridge, NJ (US); Yan Zhou, San Diego, CA (US); Jing Sun, San Diego, CA (US); Tao Luo, San Diego, CA (US); Junyi Li, Fairless Hills, PA (US); Navid Abedini, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 872 days.

(21) Appl. No.: 17/518,403

(22) Filed: Nov. 3, 2021

(65) Prior Publication Data

US 2023/0133900 A1    May 4, 2023

(51) Int. Cl.
*H04W 72/12* (2023.01)
*H04L 5/14* (2006.01)

(52) U.S. Cl.
CPC ........... *H04W 72/12* (2013.01); *H04L 5/1438* (2013.01)

(58) Field of Classification Search
CPC .................................................... H04W 72/12
USPC ........................................................ 370/329
See application file for complete search history.

(56) References Cited

U.S. PATENT DOCUMENTS

| 2020/0170010 A1 | 5/2020 | Luo et al. |
| 2021/0235301 A1 | 7/2021 | Abedini et al. |
| 2021/0337489 A1* | 10/2021 | Abotabl ................. H04L 5/14 |

FOREIGN PATENT DOCUMENTS

WO    WO-2021035457 A1    3/2021

OTHER PUBLICATIONS

International Search Report and Written Opinion—PCT/US2022/045887—ISA/EPO—Dec. 19, 2022.

* cited by examiner

*Primary Examiner* — Angel T Brockman
(74) *Attorney, Agent, or Firm* — Holland & Hart LLP

(57) ABSTRACT

Methods, systems, and devices for wireless communications are described. A base station may identify an applicable restricted resource scheduling rule for restricting full-duplex operation on a first set of resources. The base station may transmit one or more control messages scheduling one or more full-duplex communications on a second set of resources based on the applicable restricted resource scheduling rule for restricting full-duplex operation on the first set of resources. In some examples, the second set of resources may overlap in time with the first set of resources. In other examples, the second set of resources may not overlap with the first set of resources in time or frequency. Accordingly, the base station may communicate the one or more full-duplex communications on the second set of resources. The described techniques may enable the base station to perform full-duplex communications with reduced interference and improved reliability.

30 Claims, 12 Drawing Sheets

TECHNIQUES FOR SCHEDULING FULL-DUPLEX COMMUNICATIONS

FIELD OF TECHNOLOGY

The following relates to wireless communications, including techniques for scheduling full-duplex communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, devices may be capable of performing full-duplex communications. Full-duplex communications may be associated with higher throughput, reduced latency, and greater spectral efficiency. However, some full-duplex communication schemes may also result in higher interference and decreased reliability.

SUMMARY

The described techniques relate to improved methods, systems, devices, and apparatuses that support techniques for scheduling full-duplex communications. Generally, the described techniques provide for performing full-duplex communications with reduced interference and greater reliability. In accordance with aspects of the present disclosure, a base station may identify an applicable restricted resource scheduling rule for restricting full-duplex operation on a first set of resources. The base station may transmit one or more control messages scheduling one or more full-duplex communications on a second set of resources based on the applicable restricted resource scheduling rule for restricting full-duplex operation on the first set of resources. In some examples, the second set of resources may overlap in time with the first set of resources. In other examples, the second set of resources may not overlap with the first set of resources in time or frequency. Accordingly, the base station may communicate the one or more full-duplex communications on the second set of resources. The described techniques may enable the base station to perform full-duplex communications with reduced interference and improved reliability, among other benefits.

A method for wireless communications at a base station is described. The method may include identifying an applicable restricted resource scheduling rule for restricting full-duplex operation on a first set of resources in full-duplex mode, transmitting one or more control messages scheduling one or more full-duplex communications on a second set of resources based on the applicable restricted resource scheduling rule for restricting full-duplex operation on the first set of resources in full-duplex mode, and communicating the one or more full-duplex communications.

An apparatus for wireless communications at a base station is described. The apparatus may include a processor and a memory coupled with the processor, where the memory comprises instructions executable by the processor to cause the apparatus to identify an applicable restricted resource scheduling rule for restricting full-duplex operation on a first set of resources in full-duplex mode, transmit one or more control messages scheduling one or more full-duplex communications on a second set of resources based on the applicable restricted resource scheduling rule for restricting full-duplex operation on the first set of resources in full-duplex mode, and communicate the one or more full-duplex communications.

Another apparatus for wireless communications at a base station is described. The apparatus may include means for identifying an applicable restricted resource scheduling rule for restricting full-duplex operation on a first set of resources in full-duplex mode, means for transmitting one or more control messages scheduling one or more full-duplex communications on a second set of resources based on the applicable restricted resource scheduling rule for restricting full-duplex operation on the first set of resources in full-duplex mode, and means for communicating the one or more full-duplex communications.

A non-transitory computer-readable medium storing code for wireless communications at a base station is described. The code may include instructions executable by a processor to identify an applicable restricted resource scheduling rule for restricting full-duplex operation on a first set of resources in full-duplex mode, transmit one or more control messages scheduling one or more full-duplex communications on a second set of resources based on the applicable restricted resource scheduling rule for restricting full-duplex operation on the first set of resources in full-duplex mode, and communicate the one or more full-duplex communications.

In some examples of the method, apparatuses, and non-transitory computer-readable medium described herein, transmitting the one or more control messages may include operations, features, means, or instructions for transmitting the one or more control messages scheduling the one or more full-duplex communications on the second set of resources that does not overlap with the first set of resources in time or frequency.

In some examples of the method, apparatuses, and non-transitory computer-readable medium described herein, transmitting the one or more control messages may include operations, features, means, or instructions for transmitting the one or more control messages scheduling the one or more full-duplex communications on the second set of resources that at least partially overlap in time with the first set of resources, where a guard band separates the first set of resources from the second set of resources in frequency.

In some examples of the method, apparatuses, and non-transitory computer-readable medium described herein, transmitting the one or more control messages may include operations, features, means, or instructions for transmitting the one or more control messages scheduling the one or more full-duplex communications on the second set of resources that may be dedicated for full-duplex communications.

In some examples of the method, apparatuses, and non-transitory computer-readable medium described herein, transmitting the one or more control messages may include operations, features, means, or instructions for transmitting the one or more control messages scheduling the one or more full-duplex communications on the second set of resources, where a defined guard band or a minimum guard band occurs in frequency between the first set of resources and the second set of resources.

In some examples of the method, apparatuses, and non-transitory computer-readable medium described herein, transmitting the one or more control messages may include operations, features, means, or instructions for transmitting the one or more control messages scheduling the one or more full-duplex communications on the second set of resources based on the applicable restricted resource scheduling rule and on a synchronization signal block (SSB) reference signal received power (RSRP) measurement of a neighboring cell.

In some examples of the method, apparatuses, and non-transitory computer-readable medium described herein, identifying the applicable restricted resource scheduling rule may include operations, features, means, or instructions for identifying the applicable restricted resource scheduling rule for restricting full-duplex operation on the first set of resources in full-duplex mode, the first set of resources including a common radio resource control (RRC) downlink symbol, a common RRC uplink symbol, a dedicated RRC downlink symbol, a dedicated RRC uplink symbol, or any combination thereof.

In some examples of the method, apparatuses, and non-transitory computer-readable medium described herein, identifying the applicable restricted resource scheduling rule may include operations, features, means, or instructions for identifying the applicable restricted resource scheduling rule for restricting full-duplex operation on the first set of resources in full-duplex mode, the first set of resources including a resource associated with a downlink slot format indicator (SFI) configuration, a resource associated with an uplink SFI configuration, a resource associated with a flexible SFI configuration, or any combination thereof.

In some examples of the method, apparatuses, and non-transitory computer-readable medium described herein, identifying the applicable restricted resource scheduling rule may include operations, features, means, or instructions for identifying the applicable restricted resource scheduling rule for restricting full-duplex operation on the first set of resources in full-duplex mode, the first set of resources including a resource configured for transmission of an SSB, a control resource set (CORESET) for a common search space (CSS), a downlink shared channel resource configured for transmission of a paging message or remaining minimum system information (RMSI), a resource configured for a random access occasion, a resource configured for transmission of a beam failure report (BFR) synchronization signal, a resource configured for transmission of a BFR uplink control channel message, a resource configured for transmission of a scheduling request, or any combination thereof.

In some examples of the method, apparatuses, and non-transitory computer-readable medium described herein, identifying the applicable restricted resource scheduling rule may include operations, features, means, or instructions for identifying the applicable restricted resource scheduling rule for restricting full-duplex operation on the first set of resources in full-duplex mode, the first set of resources including a set of resources associated with a slot pattern, a set of resources associated with a symbol pattern, a set of resources configured for full-duplex communications, a set of resources restricted from full-duplex communications, or any combination thereof.

Some examples of the method, apparatuses, and non-transitory computer-readable medium described herein may further include operations, features, means, or instructions for communicating, via a backhaul connection or an over-the-air (OTA) link, control signaling indicating the applicable restricted resource scheduling rule, the first set of resources, or both.

In some examples of the method, apparatuses, and non-transitory computer-readable medium described herein, identifying the applicable restricted resource scheduling rule may include operations, features, means, or instructions for identifying the applicable restricted resource scheduling rule for restricting full-duplex operation on the first set of resources in full-duplex mode, the first set of resources including a set of resources configured for a measurement gap, a set of resources associated with an SSB-based measurement timing (SMTC) configuration, or both.

In some examples of the method, apparatuses, and non-transitory computer-readable medium described herein, identifying the applicable restricted resource scheduling rule may include operations, features, means, or instructions for identifying the applicable restricted resource scheduling rule for restricting full-duplex operation on the first set of resources in full-duplex mode, the first set of resources including one or more of a pilot reference signal resource, a beam management reference signal resource, a tracking reference signal (TRS) resource, a sounding reference signal (SRS) resource, a channel state information (CSI) reference signal (CSI-RS) resource, a phase tracking reference signal (PTRS) resource, or any combination thereof.

In some examples of the method, apparatuses, and non-transitory computer-readable medium described herein, identifying the applicable restricted resource scheduling rule may include operations, features, means, or instructions for identifying the applicable restricted resource scheduling rule for restricting full-duplex operation on the first set of resources in full-duplex mode, the first set of resources including a set of resources configured for a transmission repetition, a set of resources configured for slot aggregation, or both.

In some examples of the method, apparatuses, and non-transitory computer-readable medium described herein, identifying the applicable restricted resource scheduling rule may include operations, features, means, or instructions for identifying the applicable restricted resource scheduling rule for restricting full-duplex operation on the first set of resources in full-duplex mode, the first set of resources including a set of resources configured for ultra-reliability low latency communications (URLLC), a set of resources configured for semi-persistent transmissions, a set of resources allocated by a configured grant, or any combination thereof.

In some examples of the method, apparatuses, and non-transitory computer-readable medium described herein, identifying the applicable restricted resource scheduling rule may include operations, features, means, or instructions for identifying the applicable restricted resource scheduling rule for restricting full-duplex operation on the first set of resources in full-duplex mode, the first set of resources including an active bandwidth part (BWP) of a neighboring cell.

In some examples of the method, apparatuses, and non-transitory computer-readable medium described herein, the applicable restricted resource scheduling rule may be applicable to the base station, a user equipment (UE) connected to the base station, a neighboring cell, a UE connected to the neighboring cell, or any combination thereof.

Some examples of the method, apparatuses, and non-transitory computer-readable medium described herein may further include operations, features, means, or instructions for receiving, via a backhaul connection, slot format information associated with a neighboring cell, where identifying the applicable restricted resource scheduling rule for restricting full-duplex operation on the first set of resources in full-duplex mode may be based on the slot format information.

In some examples of the method, apparatuses, and non-transitory computer-readable medium described herein, the applicable restricted resource scheduling rule includes a full-duplex communication restriction associated with the first set of resources.

DETAILED DESCRIPTION

Figure 1:
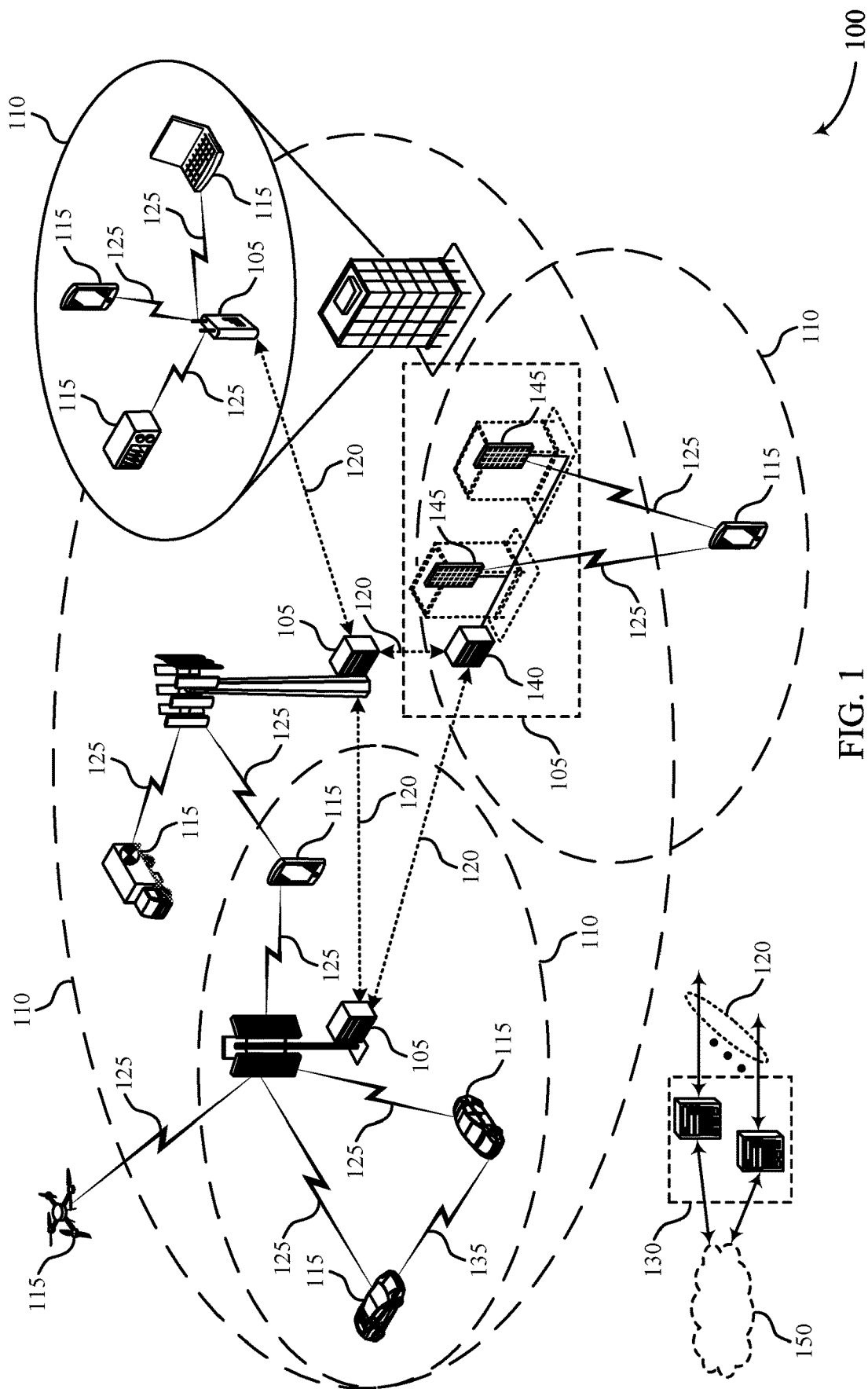
FIGS. 1 and 2 illustrate examples of wireless communications systems that support techniques for scheduling full-duplex communications in accordance with aspects of the present disclosure.

In some wireless communications systems, devices may be capable of performing full-duplex communications. For example, a base station may be capable of receiving an uplink message from a first user equipment (UE) while simultaneously transmitting a downlink message to a second UE. Full-duplex communications may be associated with higher throughput, reduced latency, and greater spectral efficiency. However, some full-duplex communication schemes may result in higher interference and decreased communication reliability. For example, if a base station attempts to transmit a downlink message to a first UE while simultaneously receiving an uplink message from a second UE in a same resource, transmission of the downlink message may interfere with reception of the uplink message. In some cases, this interference may result in decreased communication reliability at the base station.

Aspects of the present disclosure provide for performing full-duplex communications with greater reliability and decreased interference based on restricting devices from performing full-duplex communications on specific resources (e.g., time and frequency resources). For example, a base station may be restricted from scheduling full-duplex communications in specific time and frequency resources. Introducing full-duplex scheduling restrictions may result in lower interference and greater communication reliability, among other benefits. In some examples, the base station may be preconfigured with the full-duplex scheduling restrictions. Alternatively, the base station may receive scheduling information from a second base station, and may determine the full-duplex scheduling restrictions based on the scheduling information from the second base station.

In some examples, the base station may be unable to schedule full-duplex communications on a set of restricted resources. In other examples, the base station may schedule full-duplex communications on resources that overlap with the set of restricted resources (e.g., in the time-domain), provided that there is a guard band between the restricted resources and the scheduled resources. Including a guard band between the restricted resources and the scheduled resources may decrease the likelihood of leakage (e.g., interference) between the restricted resources and the scheduled resources.

In other examples, the base station may be configured with time and frequency resources that are dedicated to full-duplex communications. In such examples, the base station may be unable to schedule full-duplex communications outside of the dedicated resources. The techniques described herein may enable wireless devices (e.g., UEs and base stations) to perform full-duplex communications with reduced interference (e.g., self-interference, inter-UE interference, inter-base station interference) and greater communication reliability, among other benefits.

Aspects of the disclosure are initially described in the context of wireless communications systems, resource mappings, and process flows. Aspects of the disclosure are further illustrated by and described with reference to apparatus diagrams, system diagrams, and flowcharts that relate to techniques for scheduling full-duplex communications.

FIG. 1 illustrates an example of a wireless communications system 100 that supports techniques for scheduling full-duplex communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_S = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RB)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions.

The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as a radio head, smart radio head, or transmission/reception point (TRP). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Some wireless communications systems may support full-duplex communications between wireless devices. For example, a wireless communications system may support simultaneous uplink and downlink transmission in a specific frequency range (e.g., frequency range 2 (FR2) or other frequency bands). The wireless communications system 100 may support full-duplex communications for IAB nodes or for access links between UEs 115 and base stations 105. Both UEs 115 and base stations 105 may be capable of performing full-duplex communications. For example, a UE 115 or a base station 105 may perform uplink transmission and downlink reception using different antenna panels.

Full-duplex capabilities may depend on beam separation. In some examples, full-duplex communications may result in self-interference (e.g., between uplink and downlink operations), clutter echo, or both. However, full-duplex communications may also provide latency reduction. For example, a UE 115 may be able to receive a downlink signal in uplink slots, which may enable the UE 115 to experience latency savings. Full-duplex communications may also provide spectrum efficiency enhancements (e.g., per cell or per UE) and more efficient resource utilization.

Aspects of the present disclosure provide for restricting a base station 105 from scheduling full-duplex communications on specific resources. That is, the base station 105 may be restricted to scheduling full-duplex communications on a subset of time and frequency resources. Introducing full-duplex scheduling restrictions (e.g., restricted resource scheduling rules) may reduce inter-base station interference and inter-UE interference for critical channels and reference signals, and may ensure baseline performance. These full-duplex scheduling restrictions may be predefined, which may provide performance enhancements for deployments in which multiple operators share the same spectrum. Specifically, using predefined full-duplex scheduling restrictions may support aligned scheduling across multiple operators.

The wireless communications system 100 may support techniques for improved communication reliability and reduced interference, among other benefits. For example, the described techniques may provide for configuring a base station 105 with an applicable restricted resource scheduling rule. This applicable restricted resource scheduling rule may restrict the base station 105 from scheduling one or more full-duplex communications on a set of one or more restricted resources (e.g., one or more restricted resources 320 described with reference to FIG. 3). Additionally or alternatively, the applicable restricted resource scheduling rule may restrict the base station 105 to scheduling one or more full-duplex communications on a set of one or more dedicated resources (e.g., one or more dedicated resources 330 described with reference to FIG. 3). Configuring the base station 105 with a restricted resource scheduling rule may reduce interference levels on the set of one or more restricted resources and increase the likelihood of successful communications at the base station 105.

Figure 2:
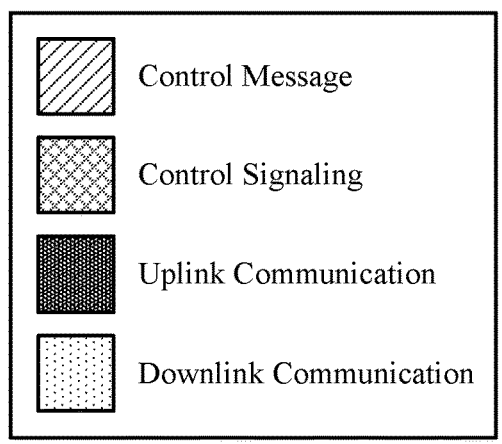
Figure 2:
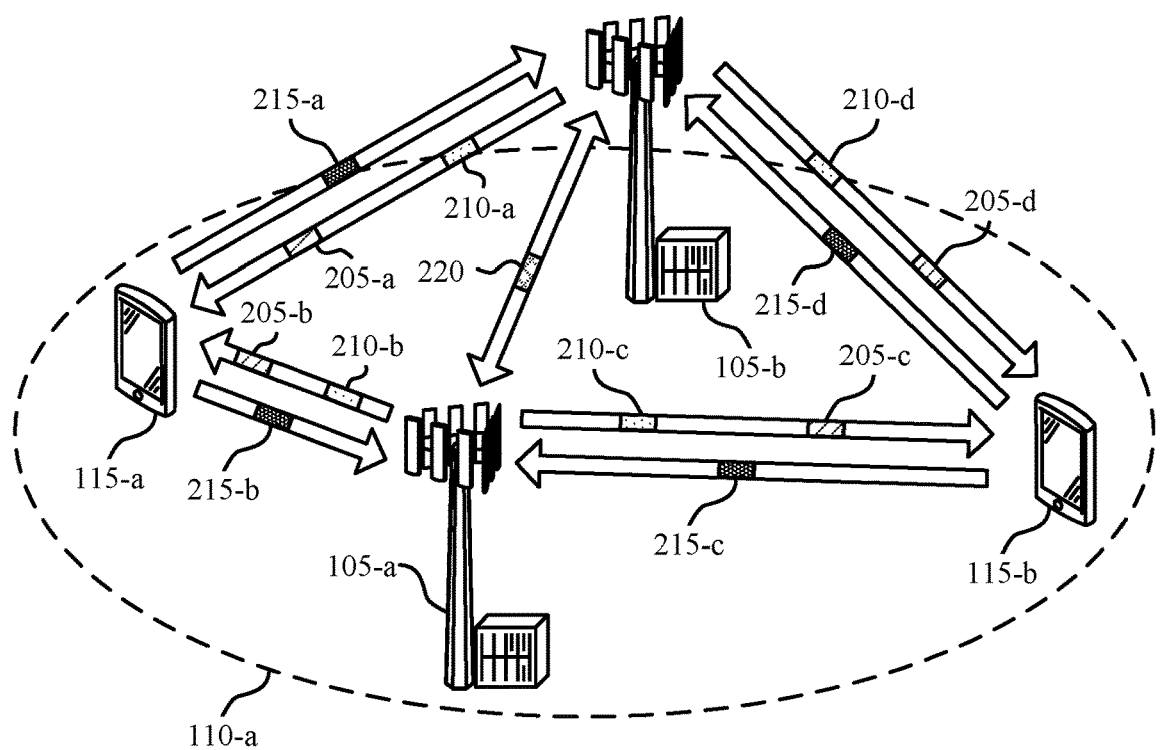

FIG. 2 illustrates an example of a wireless communications system 200 that supports techniques for scheduling full-duplex communications in accordance with aspects of the present disclosure. The wireless communications system 200 may implement or be implemented by aspects of the wireless communications system 100. For example, the wireless communications system 200 may include a UE 115-*a*, a UE 115-*b*, a base station 105-*a*, and a base station 105-*b*, which may be examples of corresponding devices described with reference to FIG. 1. The base stations 105 and the UEs 115 may communicate within a geographic coverage area 110-*a*, which may be an example of a geographic coverage area 110 described with reference to FIG. 1. In the wireless communications system 200, the base stations 105 may refrain from scheduling full-duplex communications on a set of restricted resources in accordance with a restricted resource scheduling rule.

The wireless communications system 200 may support different full-duplex use cases and types. Some example use cases of full-duplex may include full-duplex communications between one UE and two TRPs, full-duplex communications between one base station and two UEs, or full-duplex communications between one UE and one base station. For example, the UE 115-*a* may receive a downlink communication 210-*a* from the base station 105-*b* while simultaneously transmitting an uplink communication 215-*b* to the base station 105-*a*. Likewise, the base station 105-*b* may receive an uplink communication 215-*d* from the UE 115-*b* while simultaneously transmitting a downlink communication 210-*a* to the UE 115-*a*. Additionally or alternatively, the base station 105-*a* may transmit a downlink communication 210-*c* to the UE 115-*b* while simultaneously receiving an uplink communication 215-*c* from the UE 115-*b*.

In the example of FIG. 2, the base stations 105 may identify an applicable restricted resource scheduling rule for restricting full-duplex operation on a set of one or more restricted resources (e.g., a first set of resources). The base stations 105 may identify the applicable restricted resource scheduling rule based on communicating control signaling 220 over-the-air (OTA) or over a backhaul connection such as an Xn interface or an F1 interface. The control signaling 220 may indicate the applicable restricted resource scheduling rule, the set of one or more restricted resources, slot format information associated with the base stations 105, or a combination thereof.

After identifying the applicable restricted resource scheduling rule, the base stations 105 may transmit control messages 205 to the UEs 115. For example, the base station 105-*a* may transmit a control message 205-*b* to the UE 115-*a*, and may transmit a control message 205-*c* to the UE 115-*b*. Similarly, the base station 105-*c* may transmit a control message 205-*a* to the UE 115-*a*, and may transmit a control message 205-*d* to the UE 115-*b*. The control messages 205 may schedule one or more full-duplex communications on a set of one or more available resources (e.g., a second set of resources). In some examples, the set of one or more available resources may not overlap with the set of restricted resources in time or frequency. In other examples, the set of one or more available resources may overlap in time with the set of one or more restricted resources if there is a guard band between the set of one or more available resources and the set of one or more restricted resources (e.g., if there are a threshold number of guard tones between the set of one or more available resources and the set of one or more restricted resources). In some examples, the set of one or more available resources may be dedicated for full-duplex communications.

Accordingly, the base stations 105 may perform the full-duplex communications (e.g., one or more full-duplex communications) with the UEs 115 on the set of one or more available resources. For example, the base station 105-a may transmit a downlink communication 210-b to the UE 115-a while simultaneously receiving an uplink communication 215-b from the UE 115-a. Additionally or alternatively, the base station 105-a may transmit a downlink communication 210-c to the UE 115-b while simultaneously receiving an uplink communication 215-c from the UE 115-b. Likewise, the base station 105-b may transmit a downlink communication 210-a to the UE 115-a while simultaneously receiving an uplink communication 215-a from the UE 115-a. Additionally or alternatively, the base station 105-b may transmit a downlink communication 210-d to the UE 115-b while simultaneously receiving an uplink communication 215-d from the UE 115-b.

The wireless communications system 200 may support techniques for improved communication reliability and reduced interference, among other benefits. For example, the described techniques may provide for configuring the base stations 105 with an applicable restricted resource scheduling rule. The applicable restricted resource scheduling rule may restrict the base stations 105 from scheduling one or more full-duplex communications on a set of one or more restricted resources (e.g., one or more restricted resources 320 described with reference to FIG. 3). Additionally or alternatively, the applicable restricted resource scheduling rule may restrict the base stations 105 to scheduling full-duplex communications on a set of one or more dedicated resources (e.g., one or more dedicated resources 330 described with reference to FIG. 3). Configuring the base stations with restricted resource scheduling rules may reduce interference levels on the set of one or more restricted resources and increase the likelihood of successful communications at the base stations 105.

Figure 3:
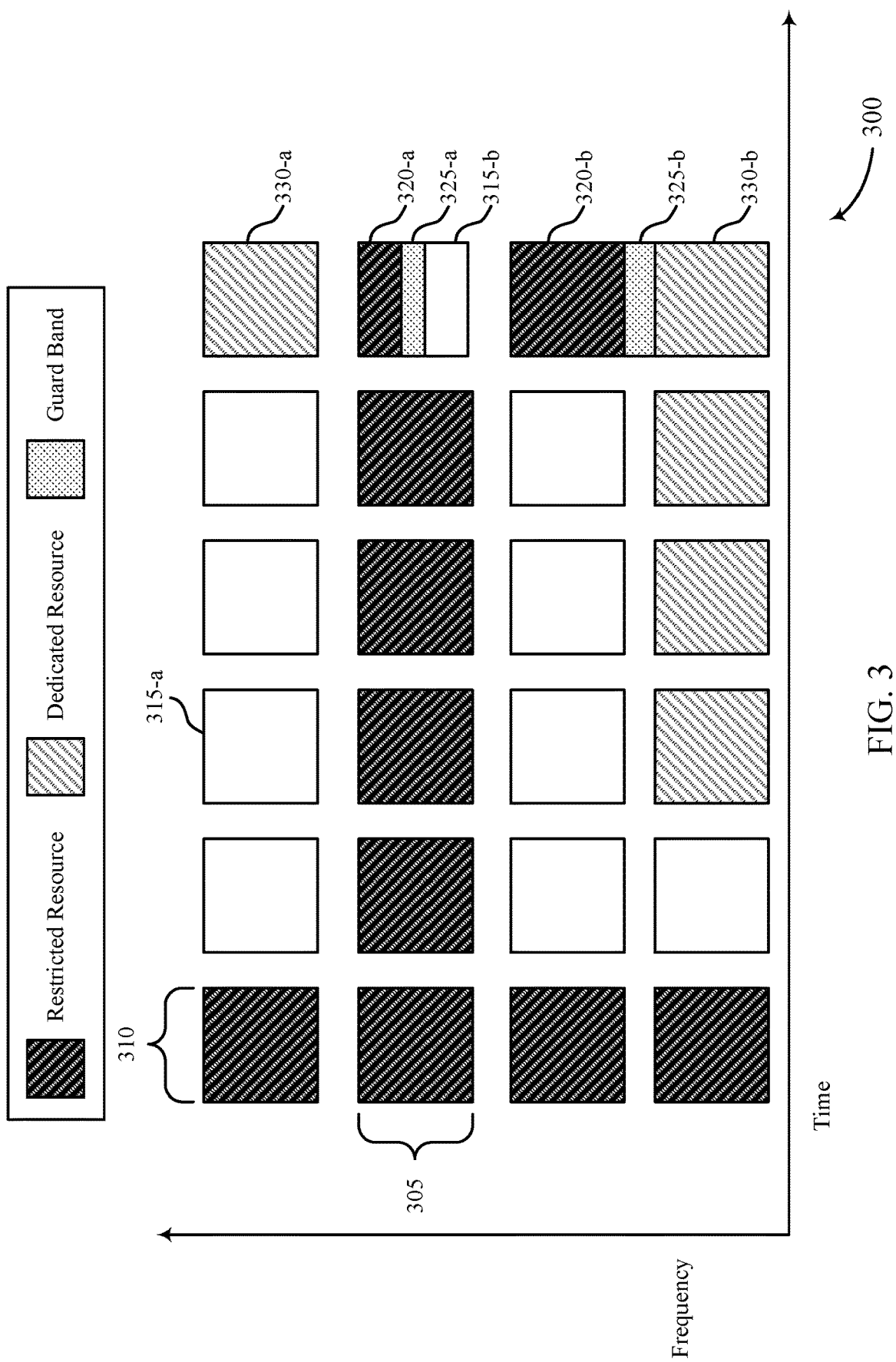
FIG. 3 illustrates an example of a resource mapping that supports techniques for scheduling full-duplex communications in accordance with aspects of the present disclosure.

FIG. 3 illustrates an example of a resource mapping 300 that supports techniques for scheduling full-duplex communications in accordance with aspects of the present disclosure. The resource mapping 300 may implement or be implemented by aspects of the wireless communications system 100 or the wireless communications system 200. For example, the resource mapping 300 may implement or be implemented by a base station or a UE, which may be examples of corresponding devices described with reference to FIGS. 1 and 2. In accordance with the resource mapping 300, a base station may refrain from scheduling full-duplex communications on one or more restricted resources 320 based on a restricted resource scheduling rule.

For base stations that support full-duplex communications, scheduled full-duplex communications may have restrictions for a set of restricted time and frequency resources. The set of restricted time and frequency resources (e.g., the one or more restricted resources 320) may include RRC common downlink or uplink symbols, RRC dedicated downlink or uplink symbols, slot format indicator (SFI) downlink, uplink, or flexible symbols, synchronization signal block (SSB) resources, CORESETs configured for a common search space (CSS), remaining minimum system information (RMSI) or paging physical downlink shared channel (PDSCH) resources, resources configured for random access occasions, beam failure report (BFR) synchronization signal resources, BFR physical uplink control channel (PUCCH) resources, resources configured for scheduling requests, resources associated with a base station-coordinated (e.g., informed) slot or symbol pattern allowing or restricting full operations (e.g. via backhaul or OTA), or a combination thereof.

Additionally or alternatively, the set of restricted time and frequency resources (e.g., the one or more restricted resources 320) may include measurement gap resources, SSB-based measurement timing configuration (SMTC) resources, pilot reference signal resources, beam management reference signal resources, tracking reference signal (TRS) resources, sounding reference signal (SRS) resources, channel state information reference signal (CSI-RS) resources, phase tracking reference signal (PTRS) resources, resources for transmission or reception with repetition (e.g., slot aggregation), URLLC resources, semi-persistent scheduled (SPS) or configured grant resources, or a combination thereof. Restricted resource scheduling rules associated with these restricted time and frequency resources may be applicable to a base station, a UE connected to the base station, a neighboring cell of the base station, or a UE connected to the neighboring cell, among other examples.

In accordance with aspects of the present disclosure, a base station may be configured with an applicable restricted resource scheduling rule. In some examples, the applicable restricted resource scheduling rule may indicate that scheduled full-duplex resources (e.g., resources allocated for simultaneous transmission and reception) cannot overlap in time or frequency with the set of restricted time and frequency resources. These full-duplex scheduling restrictions may also indicate that a reverse direction transmission of an aggressor cell cannot overlap with an active BWP on RRC configured downlink or uplink symbols of a victim cell (e.g., where aggressor and victim cells can be the same or different). The aggressor cell may be defined as the cell with the highest SSB reference signal received power (RSRP) measurement from the victim cell above a threshold. In some examples, a base station can obtain slot format information for cells controlled by another base station via an Xn interface or an F1 interface.

In other examples, the applicable restricted resource scheduling rule may indicate that scheduled full-duplex resources can only overlap in time with the set of restricted resources (e.g., the one or more restricted resources 320) when a guard band between the scheduled full-duplex resources and the set of restricted resources includes a threshold number of guard tones (e.g., subcarriers). Alternatively, or additionally, the applicable restricted resource scheduling rule may define specific time and frequency resources (e.g., one or more dedicated resources 330) that are dedicated for only full-duplex communications. These dedicated time and frequency resources (e.g., the one or more dedicated resources 330) may include, for example, a dedicated BWP, dedicated symbols, dedicated slots, or a combination thereof. Additionally or alternatively, a defined (e.g., minimum) guard band between the scheduled full-duplex resources and the set of restricted resources may be defined to reduce leakage from the scheduled full-duplex resources to the set of restricted time and frequency resources. In other examples, a base station may utilize a combination of restricted resource scheduling rules discussed herein to make full-duplex scheduling decisions.

In the example of FIG. 3, a base station may schedule full-duplex communications based on an applicable restricted resource scheduling rule associated with one or more restricted resources 320. The one or more restricted resources 320 (e.g., a first set of resources) may include multiple resources or a single resource (e.g., a single resource element, a single RB in a same symbol, a single slot). In some examples, the applicable restricted resource scheduling rule may restrict the base station from scheduling full-duplex communications on resources that overlap with the one or more restricted resources 320 in time or frequency. For example, the base station may be unable to schedule full-duplex communications on a resource that is in a restricted frequency range 305 (e.g., one or more BWPs, one or more resource elements, one or more resource blocks, one or more frequency bands. one or more frequency ranges, etc.). Similarly, the base station may be unable to schedule full-duplex communications on a resource that is in a restricted time period 310 (e.g., one or more symbol periods, one or more mini-slots, one or more slots, one or more subframes, one or more frames, etc.).

In some examples, the restricted resource scheduling rule may indicate that the base station may schedule full-duplex communications on any resources other than the one or more restricted resources 320. For example, the base station may be able to schedule full-duplex communications on a resource 315-a. In other examples, the applicable restricted resource scheduling rule may restrict the restricted resource scheduling rule may indicate that the base station may schedule full-duplex communications in the one or more dedicated resources 330 (e.g., time and frequency resources allocated for full-duplex communications). The one or more dedicated resources 330 (e.g., a second set of resources) may include multiple resources or a single resource (e.g., a single resource element, a single RB in a same symbol, a single slot). In such examples, the base station may schedule full-duplex communications on a dedicated resource 330-a, but may be unable to schedule full-duplex communications on the resource 315-a (e.g., because the resource 315-a is not one of the dedicated resources 330).

In other examples, the restricted resource scheduling rule may indicate that the base station may schedule full-duplex communications on one or more resources that overlap with one or more restricted resources 320 as long as there is a guard band with a sufficient number of guard tones between the scheduled resource(s) and the restricted resource(s) 320. For example, the base station may be able to schedule full-duplex communications on a resource 315-b if there is a guard band 325-a between the resource 315-b and a restricted resource 320-a. Similarly, the restricted resource scheduling rule may indicate that the base station may schedule full-duplex communications on a dedicated resource 330-b as long as there is a guard band 325-b between the dedicated resource 330-b and a restricted resource 320-b.

The resource mapping 300 may support techniques for improved communication reliability and reduced interference, among other benefits. For example, the described techniques may provide for configuring a base station with an applicable restricted resource scheduling rule. This applicable restricted resource scheduling rule may restrict the base station from scheduling one or more full-duplex communications on the one or more restricted resources 320 (e.g., a first set of resources). Additionally or alternatively, the applicable restricted resource scheduling rule may restrict the base station to scheduling full-duplex communications on the one or more dedicated resources 330 (e.g., a second set of resources). Configuring the base station with an applicable restricted resource scheduling rule may reduce interference levels on the one or more restricted resources 320 and increase the likelihood of successful communications at the base station.

Figure 4:
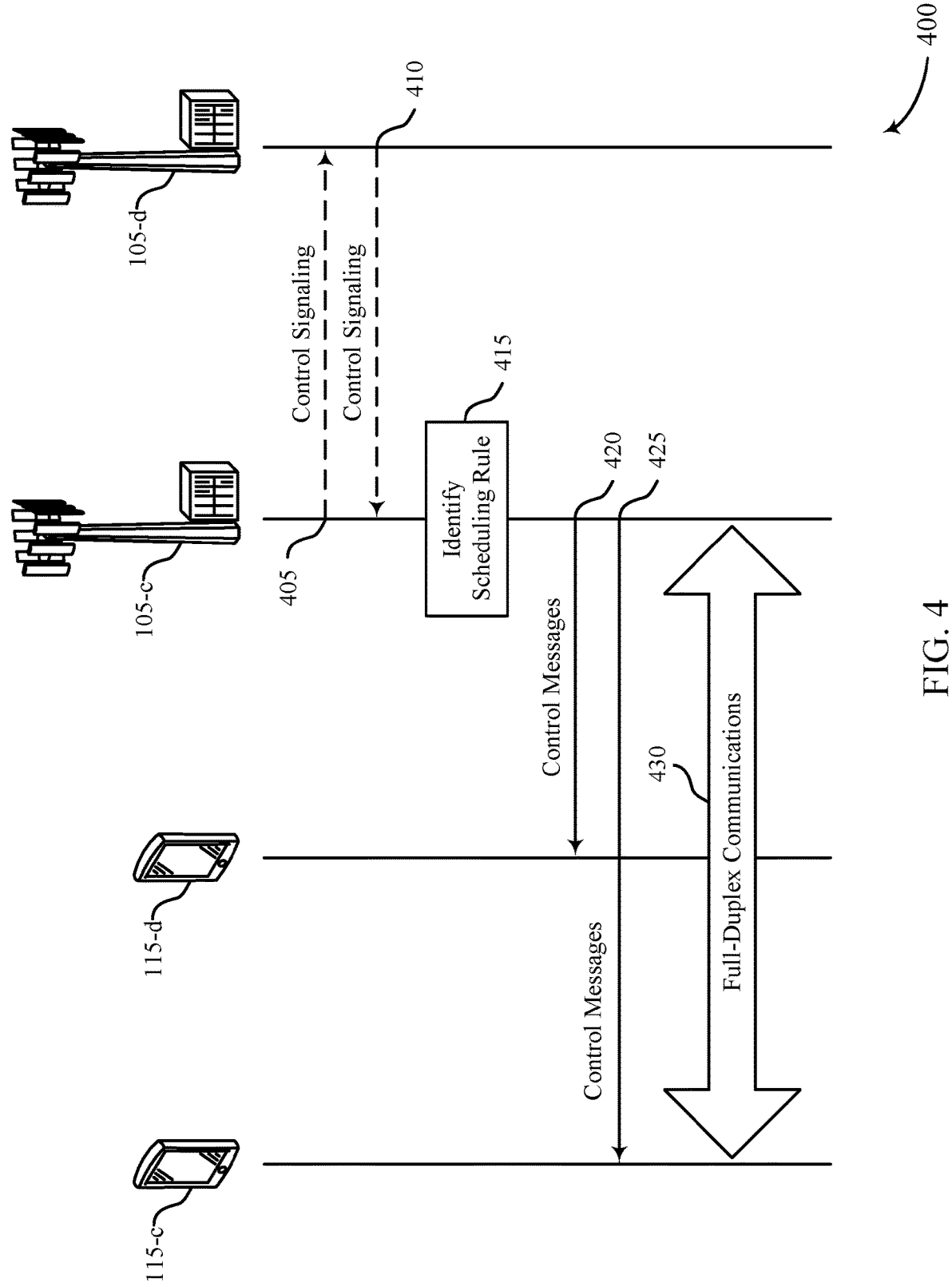
FIG. 4 illustrates an example of a process flow that supports techniques for scheduling full-duplex communications in accordance with aspects of the present disclosure.

FIG. 4 illustrates an example of a process flow 400 that supports techniques for scheduling full-duplex communications in accordance with aspects of the present disclosure. The process flow 400 may implement or be implemented by aspects of the wireless communications system 100 or the wireless communications system 200. For example, the process flow 400 may include a UE 115-c, a UE 115-d, a base station 105-c, and a base station 105-d, which may be examples of corresponding devices described with reference to FIGS. 1 and 2. In the following description of the process flow 400, operations between the UEs 115 and the base stations 105 may be performed in a different order or at a different time than as shown. Additionally or alternatively, some operations may be omitted from the process flow 400, and other operations may be added to the process flow 400.

In some examples, the base station 105-c may transmit control signaling to the base station 105-d at 405. Likewise, the base station 105-d may transmit control signaling to the base station 105-c at 410. The base stations 105 may communicate the control signaling over a backhaul link (e.g., an Xn interface or an F1 interface). In some examples, the control signaling may indicate slot format information associated with the base station 105-d or the base station 105-c. Additionally or alternatively, the control signaling may indicate a first set of resources (e.g., one or more restricted resources 320 described with reference to FIG. 3), an applicable restricted resource scheduling rule for restricting full-duplex operation on the first set of resources, or a combination thereof.

At 415, the base station 105-c may identify the applicable restricted resource scheduling rule for restricting full-duplex operation on the first set of resources in full-duplex mode, as described with reference to FIGS. 2 and 3. The base station 105-c may identify the applicable restricted resource scheduling rule based on receiving control signaling from the base station 105-d. For example, the base station 105-c may determine the applicable restricted resource scheduling rule based on receiving slot format information or an indication of an SSB-RSRP measurement from the base station 105-d. In some examples, the applicable restricted resource scheduling rule may indicate a minimum guard band for the first set of resources. The applicable restricted resource scheduling rule may be applicable to any combination of the base stations 105 and the UEs 115.

As described with reference to FIGS. 2 and 3, the first set of resources may include one or more of a common RRC downlink symbol, a common RRC uplink symbol, a dedicated RRC downlink symbol, a dedicated RRC uplink symbol, a resource associated with a downlink SFI configuration, a resource associated with an uplink SFI configuration, a resource associated with a flexible SFI configuration, a resource configured for transmission of an SSB, a CORSET for a CSS, a PDSCH resource configured for transmission of a paging message or RMSI, a resource configured for random access occasions, a resource configured for transmission of a BFR synchronization signal, a resource configured for transmission of a BFR PUCCH message, or a resource configured for transmission of a scheduling request, among other examples.

Additionally or alternatively, the first set of resources (e.g., one or more restricted resources) may include a set of resources associated with a slot pattern, a set of resources associated with a symbol pattern, a set of resources configured for full-duplex communications, a set of resources restricted from full-duplex communications, a set of resources configured for a measurement gap, a set of resources associated with an SMTC, a resource configured for pilot reference signal transmissions, a resource configured for beam management reference signal transmissions, a resource configured for TRS transmissions, a resource configured for SRS transmissions, a resource configured for CSI-RS transmissions, a set of resources configured for a transmission repetition, a set of resources configured for slot aggregation, a set of resources configured for URLLC, a set of resources configured for SPS transmissions or configured grant transmissions, or any combination thereof. In some examples, the first set of resources may correspond to an active BWP of the base station 105-d (e.g., a neighboring cell).

At 420, the base station 105-c may transmit a first control message to the UE 115-d. At 425, the base station 105-c may transmit a second control message to the UE 115-c. The first control message and the second control message may schedule one or more full-duplex communications on a second set of resources (e.g., one or more resources 315 or one or more dedicated resources 330 described with reference to FIG. 3) based on the applicable restricted resource scheduling rule for restricting full-duplex operations on the first set of resources in full-duplex mode. In some examples, the second set of resources may not overlap with the first set of resources in time or frequency. In other examples, if there is a guard band between the first set of resources and the second set of resources, the second set of resources may at least partially overlap in time with the first set of resources. Additionally or alternatively, the second set of resources may be dedicated for full-duplex communications.

At 430, the base station 105-c may communicate the one or more full-duplex communications with the UEs 115 in accordance with the first control message and the second control message. For example, the base station 105-c may transmit a downlink message to the UE 115-d while simultaneously receiving an uplink message from the UE 115-c. Additionally or alternatively, the base station 105-c may transmit a downlink message to the UE 115-c while simultaneously receiving an uplink message from the UE 115-d.

The process flow 400 may support techniques for improved communication reliability and reduced interference, among other benefits. For example, the described techniques may provide for configuring the base station 105-c with one or more restricted resource scheduling rules in which full duplex communication may be performed in a same resource. These one or more restricted resource scheduling rules may restrict the base station 105-c from scheduling one or more full-duplex communications on a set of restricted resources (e.g., one or more restricted resources 320 described with reference to FIG. 3). Additionally or alternatively, the one or more restricted resource scheduling rules may restrict the base station 105-c to scheduling full-duplex communications on a set of dedicated resources (e.g., one or more dedicated resources 330 described with reference to FIG. 3). Configuring the base station 105-c with the one or more restricted resource scheduling rules may reduce interference levels on the set of restricted resources and improve the reliability of full-duplex communications performed by the base station 105-c.

Figure 5:
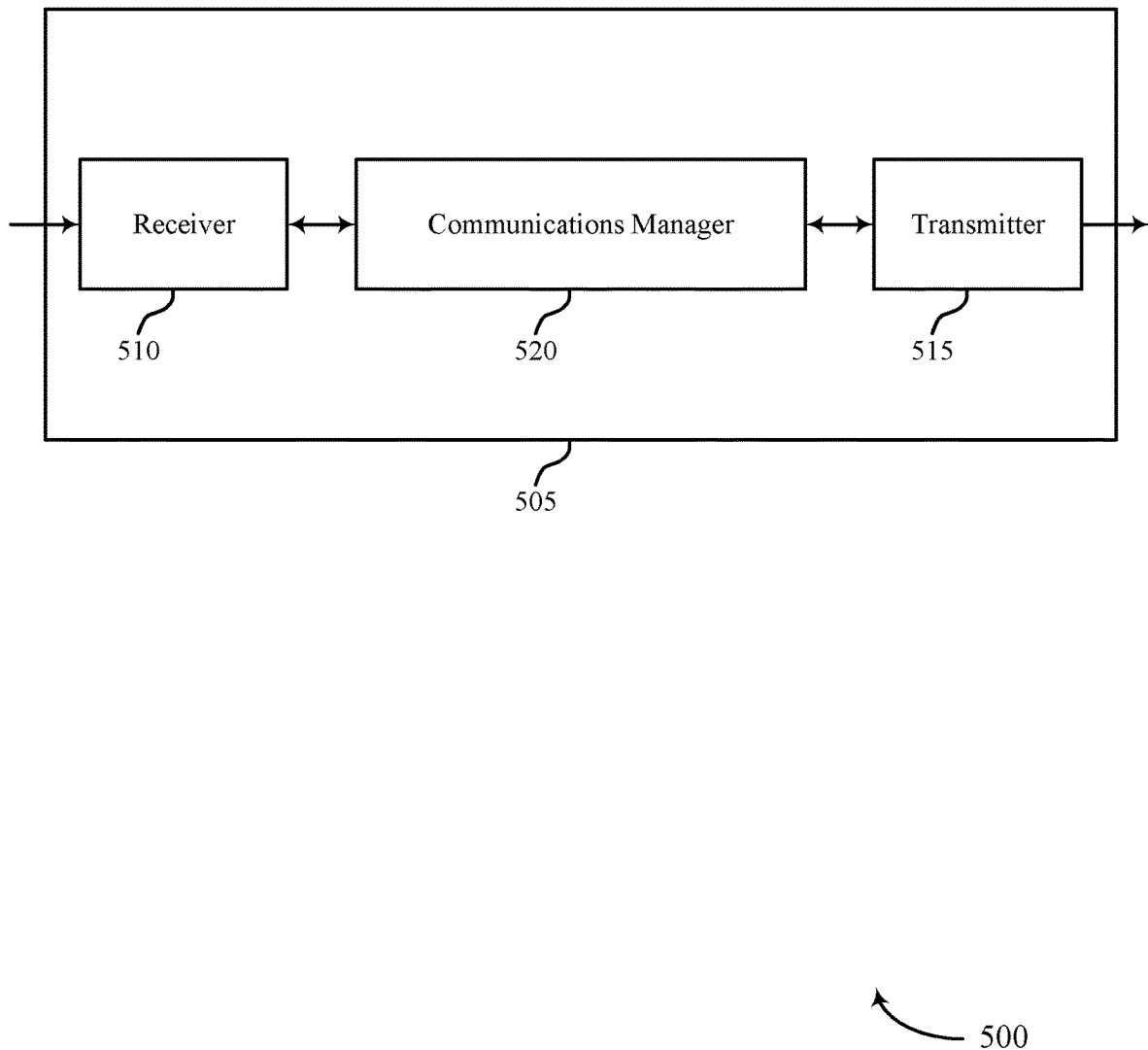
FIGS. 5 and 6 show block diagrams of devices that support techniques for scheduling full-duplex communications in accordance with aspects of the present disclosure.

FIG. 5 shows a block diagram 500 of a device 505 that supports techniques for scheduling full-duplex communications in accordance with aspects of the present disclosure. The device 505 may be an example of aspects of a base station 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for scheduling full-duplex communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for scheduling full-duplex communications). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for scheduling full-duplex communications as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and a memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at the device 505 (e.g., a base station 105) in accordance with examples as disclosed herein. For example, the communications manager 520 may be configured as or otherwise support a means for identifying an applicable restricted resource scheduling rule for restricting full-duplex operation on a first set of resources in full-duplex mode. The communications manager 520 may be configured as or otherwise support a means for transmitting one or more control messages scheduling one or more full-duplex communications on a second set of resources based on the applicable restricted resource scheduling rule for restricting full-duplex operation on the first set of resources in full-duplex mode. The communications manager 520 may be configured as or otherwise support a means for communicating the one or more full-duplex communications.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced power consumption based on reducing a number of retransmissions performed by the device 505. For example, the device 505 may refrain from scheduling full-duplex communications on a set of restricted resources, which may reduce interference caused by the full-duplex communications. Reducing the interference caused by the full-duplex communications may increase the likelihood of the full-duplex communications being successfully received. As such, the device 505 may perform fewer retransmissions of the full-duplex communications, which may result in greater power savings at the device 505, among other benefits.

Figure 6:
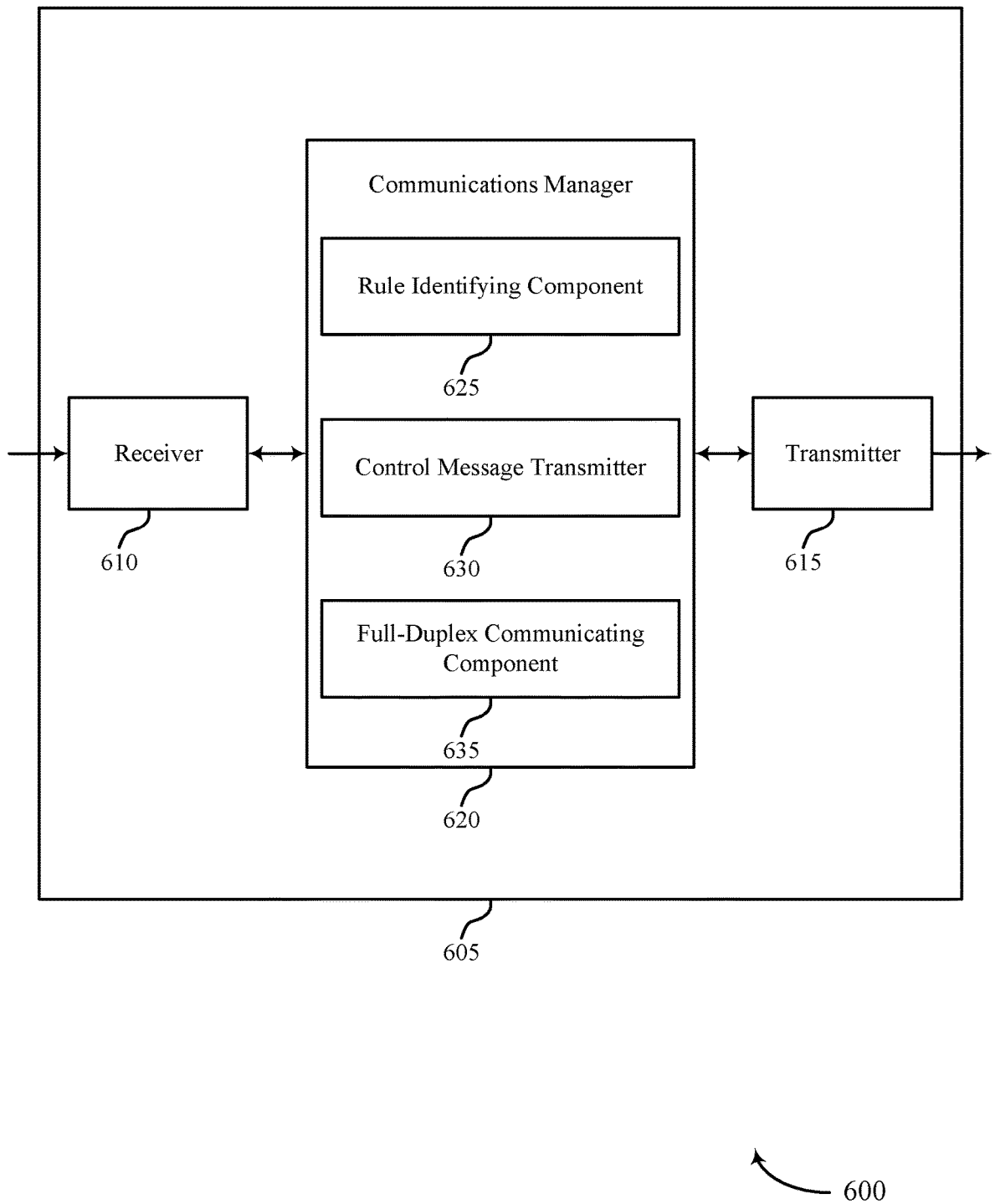

FIG. 6 shows a block diagram 600 of a device 605 that supports techniques for scheduling full-duplex communications in accordance with aspects of the present disclosure. The device 605 may be an example of aspects of a device 505 or a base station 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for scheduling full-duplex communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for scheduling full-duplex communications). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for scheduling full-duplex communications as described herein. For example, the communications manager 620 may include a rule identifying component 625, a control message transmitter 630, a full-duplex communicating component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at the device 605 (e.g., a base station 105) in accordance with examples as disclosed herein. The rule identifying component 625 may be configured as or otherwise support a means for identifying an applicable restricted resource scheduling rule for restricting full-duplex operation on a first set of resources in full-duplex mode. The control message transmitter 630 may be configured as or otherwise support a means for transmitting one or more control messages scheduling one or more full-duplex communications on a second set of resources based on the applicable restricted resource scheduling rule for restricting full-duplex operation on the first set of resources in full-duplex mode. The full-duplex communicating component 635 may be configured as or otherwise support a means for communicating the one or more full-duplex communications.

Figure 7:
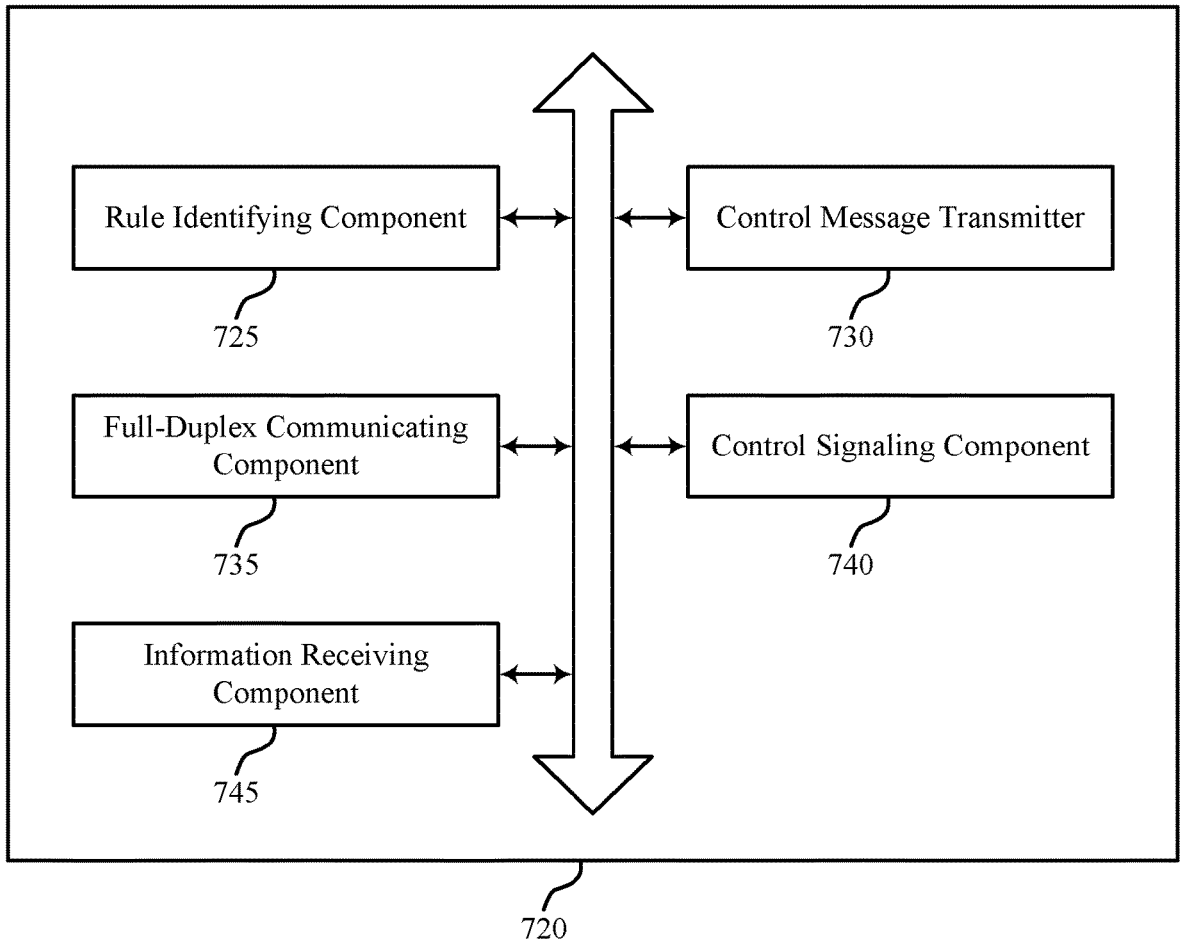
FIG. 7 shows a block diagram of a communications manager that supports techniques for scheduling full-duplex communications in accordance with aspects of the present disclosure.

FIG. 7 shows a block diagram 700 of a communications manager 720 that supports techniques for scheduling full-duplex communications in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for scheduling full-duplex communications as described herein. For example, the communications manager 720 may include a rule identifying component 725, a control message transmitter 730, a full-duplex communicating component 735, a control signaling component 740, an information receiving component 745, or any combination thereof. Each of these components may communicate, directly or indirectly, with one another (e.g., via one or more buses).

The communications manager 720 may support wireless communications at the device 705 (e.g., a base station 105) in accordance with examples as disclosed herein. The rule identifying component 725 may be configured as or otherwise support a means for identifying an applicable restricted resource scheduling rule for restricting full-duplex operation on a first set of resources in full-duplex mode. The control message transmitter 730 may be configured as or otherwise support a means for transmitting one or more control messages scheduling one or more full-duplex communications on a second set of resources based on the applicable restricted resource scheduling rule for restricting full-duplex operation on the first set of resources in full-duplex mode. The full-duplex communicating component 735 may be configured as or otherwise support a means for communicating the one or more full-duplex communications.

In some examples, to support transmitting the one or more control messages, the control message transmitter 730 may be configured as or otherwise support a means for transmitting the one or more control messages scheduling the one or more full-duplex communications on the second set of resources that does not overlap with the first set of resources in time or frequency.

In some examples, to support transmitting the one or more control messages, the control message transmitter 730 may be configured as or otherwise support a means for transmitting the one or more control messages scheduling the one or more full-duplex communications on the second set of resources that at least partially overlap in time with the first set of resources, where a guard band separates the first set of resources from the second set of resources in frequency.

In some examples, to support transmitting the one or more control messages, the control message transmitter 730 may be configured as or otherwise support a means for transmitting the one or more control messages scheduling the one or more full-duplex communications on the second set of resources that is dedicated for full-duplex communications.

In some examples, to support transmitting the one or more control messages, the control message transmitter 730 may be configured as or otherwise support a means for transmitting the one or more control messages scheduling the one or more full-duplex communications on the second set of resources, where a defined guard band or a minimum guard band occurs in frequency between the first set of resources and the second set of resources.

In some examples, to support transmitting the one or more control messages, the control message transmitter 730 may be configured as or otherwise support a means for transmitting the one or more control messages scheduling the one or more full-duplex communications on the second set of resources based on the applicable restricted resource scheduling rule and on an SSB-RSRP measurement of a neighboring cell.

In some examples, to support identifying the applicable restricted resource scheduling rule, the rule identifying component 725 may be configured as or otherwise support a means for identifying the applicable restricted resource scheduling rule for restricting full-duplex operation on the first set of resources in full-duplex mode, the first set of resources including a common RRC downlink symbol, a common RRC uplink symbol, a dedicated RRC downlink symbol, a dedicated RRC uplink symbol, or any combination thereof.

In some examples, to support identifying the applicable restricted resource scheduling rule, the rule identifying component 725 may be configured as or otherwise support a means for identifying the applicable restricted resource scheduling rule for restricting full-duplex operation on the first set of resources in full-duplex mode, the first set of resources including a resource associated with a downlink SFI configuration, a resource associated with an uplink SFI configuration, a resource associated with a flexible SFI configuration, or any combination thereof.

In some examples, to support identifying the applicable restricted resource scheduling rule, the rule identifying component 725 may be configured as or otherwise support a means for identifying the applicable restricted resource scheduling rule for restricting full-duplex operation on the first set of resources in full-duplex mode, the first set of resources including a resource configured for transmission of an SSB, a CORESET for a CSS (e.g., CORESET 0), a downlink shared channel resource configured for transmission of a paging message or RMSI, a resource configured for a RO, a resource configured for transmission of a BFR synchronization signal, a resource configured for transmission of a BFR uplink control channel message, a resource configured for transmission of a scheduling request, or any combination thereof.

In some examples, to support identifying the applicable restricted resource scheduling rule, the rule identifying component 725 may be configured as or otherwise support a means for identifying the applicable restricted resource scheduling rule for restricting full-duplex operation on the first set of resources in full-duplex mode, the first set of resources including a set of resources associated with a slot pattern, a set of resources associated with a symbol pattern, a set of resources configured for full-duplex communications, a set of resources restricted from full-duplex communications, or any combination thereof.

In some examples, the control signaling component 740 may be configured as or otherwise support a means for communicating, via a backhaul connection or an OTA link, control signaling indicating the applicable restricted resource scheduling rule, the first set of resources, or both.

In some examples, to support identifying the applicable restricted resource scheduling rule, the rule identifying component 725 may be configured as or otherwise support a means for identifying the applicable restricted resource scheduling rule for restricting full-duplex operation on the first set of resources in full-duplex mode, the first set of resources including a set of resources configured for a measurement gap, a set of resources associated with an SMTC, or both.

In some examples, to support identifying the applicable restricted resource scheduling rule, the rule identifying component 725 may be configured as or otherwise support a means for identifying the applicable restricted resource scheduling rule for restricting full-duplex operation on the first set of resources in full-duplex mode, the first set of resources including one or more of a pilot reference signal resource, a beam management reference signal resource, a TRS resource, an SRS resource, a CSI-RS resource, a PTRS resource, or any combination thereof.

In some examples, to support identifying the applicable restricted resource scheduling rule, the rule identifying component 725 may be configured as or otherwise support a means for identifying the applicable restricted resource scheduling rule for restricting full-duplex operation on the first set of resources in full-duplex mode, the first set of resources including a set of resources configured for a transmission repetition, a set of resources configured for slot aggregation, or both.

In some examples, to support identifying the applicable restricted resource scheduling rule, the rule identifying component 725 may be configured as or otherwise support a means for identifying the applicable restricted resource scheduling rule for restricting full-duplex operation on the first set of resources in full-duplex mode, the first set of resources including a set of resources configured for URLLC, a set of resources configured for semi-persistent transmissions, a set of resources allocated by a configured grant, or any combination thereof.

In some examples, to support identifying the applicable restricted resource scheduling rule, the rule identifying component 725 may be configured as or otherwise support a means for identifying the applicable restricted resource scheduling rule for restricting full-duplex operation on the first set of resources in full-duplex mode, the first set of resources including an active BWP of a neighboring cell. In some examples, the applicable restricted resource scheduling rule is applicable to the base station, a UE connected to the base station, a neighboring cell, a UE connected to the neighboring cell, or any combination thereof.

In some examples, the information receiving component 745 may be configured as or otherwise support a means for receiving, via a backhaul connection, slot format information associated with a neighboring cell, where identifying the applicable restricted resource scheduling rule for restricting full-duplex operation on the first set of resources in full-duplex mode is based on the slot format information. In some examples, the applicable restricted resource scheduling rule includes a full-duplex communication restriction associated with the first set of resources.

Figure 8:
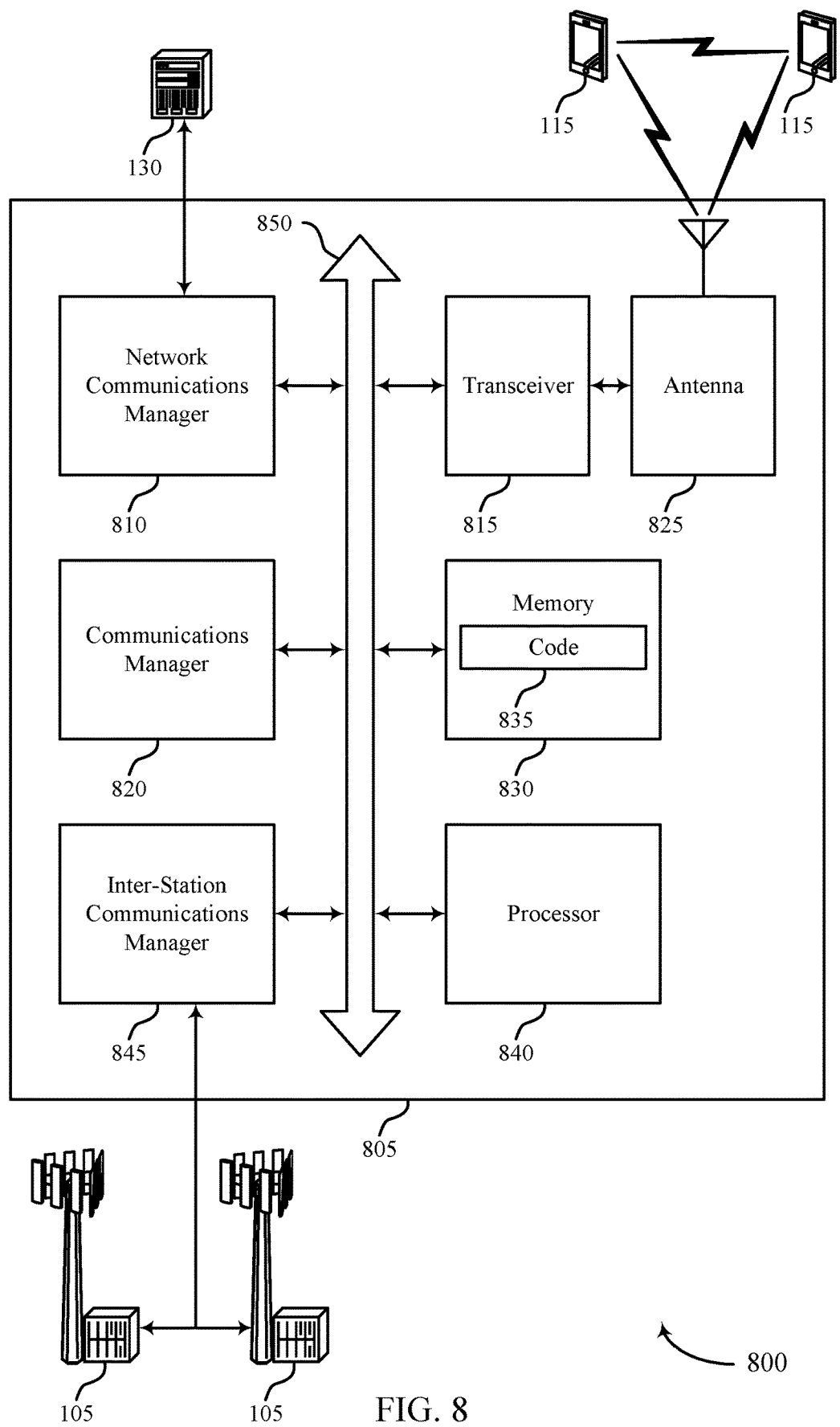
FIG. 8 shows a diagram of a system including a device that supports techniques for scheduling full-duplex communications in accordance with aspects of the present disclosure.

FIG. 8 shows a diagram of a system 800 including a device 805 that supports techniques for scheduling full-duplex communications in accordance with aspects of the present disclosure. The device 805 may be an example of or include the components of a device 505, a device 605, or a base station 105 as described herein. The device 805 may communicate wirelessly with one or more base stations 105, UEs 115, or any combination thereof. The device 805 may include components for bi-directional voice and data communications including components for transmitting and receiving communications, such as a communications manager 820, a network communications manager 810, a transceiver 815, an antenna 825, a memory 830, code 835, a processor 840, and an inter-station communications manager 845. These components may be in electronic communication or otherwise coupled (e.g., operatively, communicatively, functionally, electronically, electrically) via one or more buses (e.g., a bus 850).

The network communications manager 810 may manage communications with a core network 130 (e.g., via one or more wired backhaul links). For example, the network communications manager 810 may manage the transfer of data communications for client devices, such as one or more UEs 115.

In some cases, the device 805 may include a single antenna 825. However, in some other cases the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for scheduling full-duplex communications). For example, the device 805 or a component of the device 805 may include a processor 840 and memory 830 coupled to the processor 840, the processor 840 and memory 830 configured to perform various functions described herein.

The inter-station communications manager 845 may manage communications with other base stations 105, and may include a controller or scheduler for controlling communications with UEs 115 in cooperation with other base stations 105. For example, the inter-station communications manager 845 may coordinate scheduling for transmissions to UEs 115 for various interference mitigation techniques such as beamforming or joint transmission. In some examples, the inter-station communications manager 845 may provide an X2 interface within an LTE/LTE-A wireless communications network technology to provide communication between base stations 105.

The communications manager 820 may support wireless communications at the device 805 (e.g., a base station 105) in accordance with examples as disclosed herein. For example, the communications manager 820 may be configured as or otherwise support a means for identifying an applicable restricted resource scheduling rule for restricting full-duplex operation on a first set of resources in full-duplex mode. The communications manager 820 may be configured as or otherwise support a means for transmitting one or more control messages scheduling one or more full-duplex communications on a second set of resources based on the applicable restricted resource scheduling rule for restricting full-duplex operation on the first set of resources in full-duplex mode. The communications manager 820 may be configured as or otherwise support a means for communicating the one or more full-duplex communications.

By including or configuring the communications manager 820 in accordance with examples as described herein, the device 805 may support techniques for improved communication reliability, reduced latency, and greater spectral efficiency by refraining from scheduling full-duplex communications on a set of restricted resources. Refraining from scheduling full-duplex communications on the set of restricted resources may enable the device 805 to perform the full-duplex communications with reduced interference and greater reliability, among other benefits.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for scheduling full-duplex communications as described herein, or the processor 840 and the memory 830 may be otherwise configured to perform or support such operations.

Figure 9:
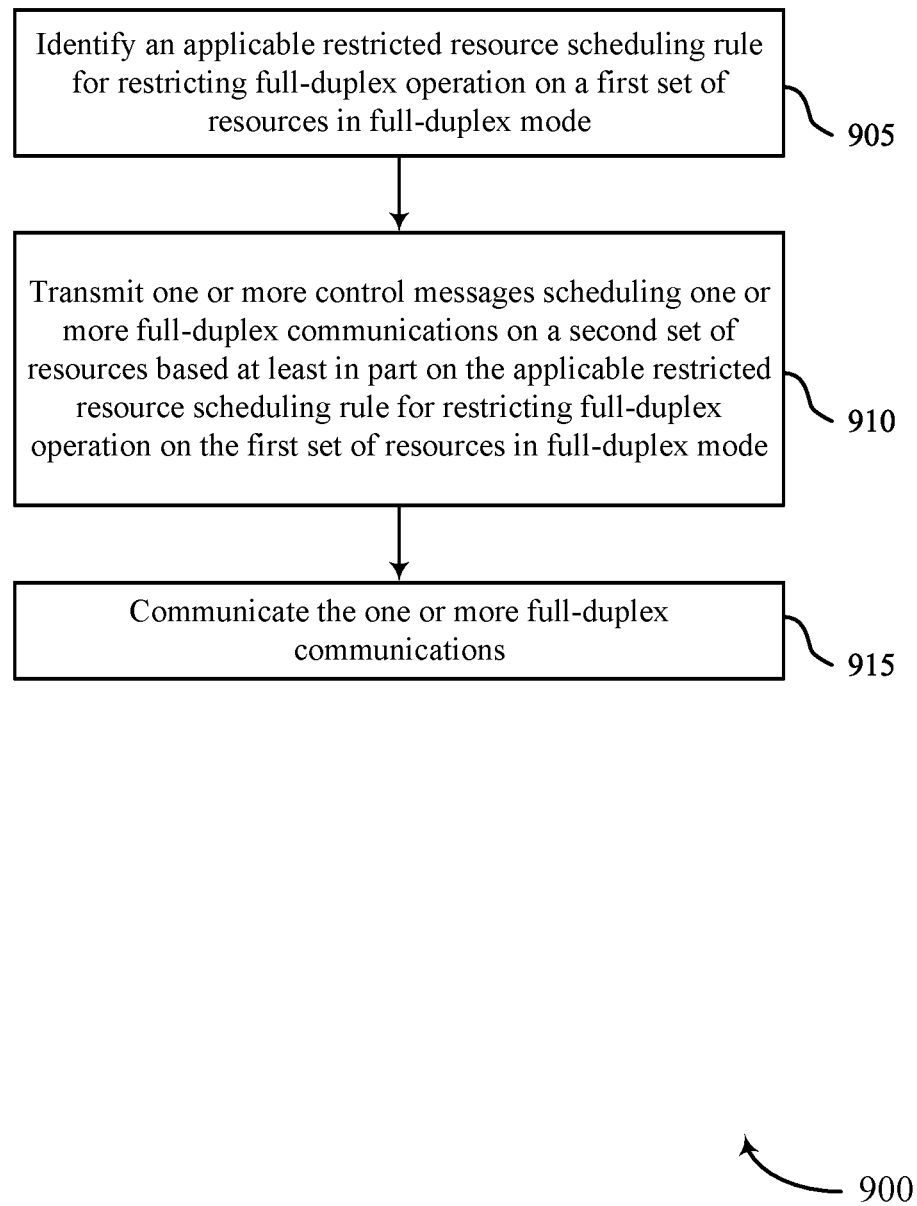
FIGS. 9 through 12 show flowcharts illustrating methods that support techniques for scheduling full-duplex communications in accordance with aspects of the present disclosure.

FIG. 9 shows a flowchart illustrating a method 900 that supports techniques for scheduling full-duplex communications in accordance with aspects of the present disclosure. The operations of the method 900 may be implemented by a base station or its components as described herein. For example, the operations of the method 900 may be performed by a base station 105 as described with reference to FIGS. 1 through 8. In some examples, a base station may execute a set of instructions to control the functional elements of the base station to perform the described functions. Additionally or alternatively, the base station may perform aspects of the described functions using special-purpose hardware.

At 905, the method may include identifying an applicable restricted resource scheduling rule for restricting full-duplex operation on a first set of resources in full-duplex mode. The operations of 905 may be performed in accordance with examples as disclosed herein. In some examples, aspects of the operations of 905 may be performed by a rule identifying component 725 as described with reference to FIG. 7.

At 910, the method may include transmitting one or more control messages scheduling one or more full-duplex communications on a second set of resources based at least in part on the applicable restricted resource scheduling rule for restricting full-duplex operation on the first set of resources in full-duplex mode. The operations of 910 may be performed in accordance with examples as disclosed herein. In some examples, aspects of the operations of 910 may be performed by a control message transmitter 730 as described with reference to FIG. 7.

At 915, the method may include communicating the one or more full-duplex communications. The operations of 915 may be performed in accordance with examples as disclosed herein. In some examples, aspects of the operations of 915 may be performed by a full-duplex communicating component 735 as described with reference to FIG. 7.

Figure 10:
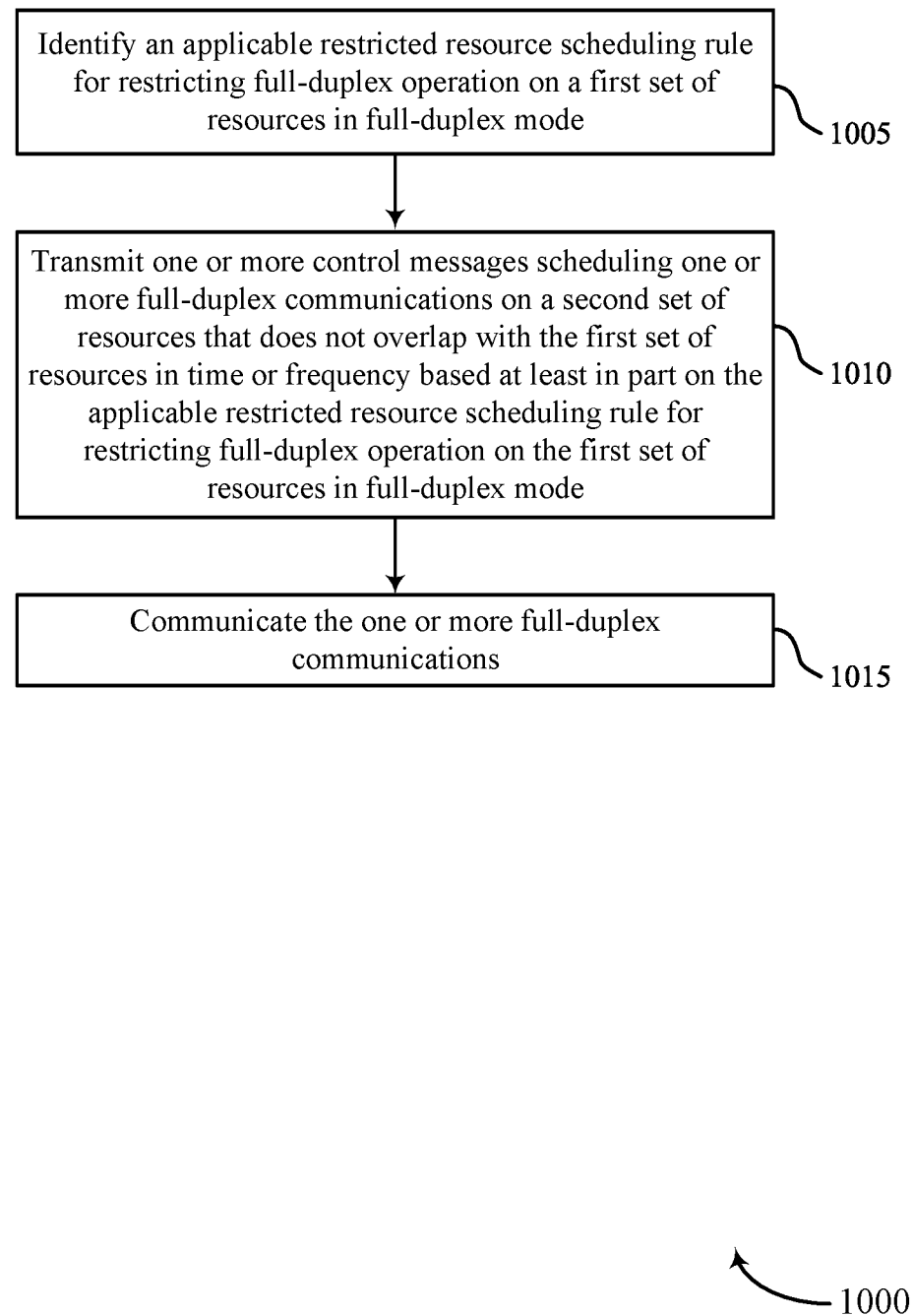

FIG. 10 shows a flowchart illustrating a method 1000 that supports techniques for scheduling full-duplex communications in accordance with aspects of the present disclosure. The operations of the method 1000 may be implemented by a base station or its components as described herein. For example, the operations of the method 1000 may be performed by a base station 105 as described with reference to FIGS. 1 through 8. In some examples, a base station may execute a set of instructions to control the functional elements of the base station to perform the described functions. Additionally or alternatively, the base station may perform aspects of the described functions using special-purpose hardware.

At 1005, the method may include identifying an applicable restricted resource scheduling rule for restricting full-duplex operation on a first set of resources in full-duplex mode. The operations of 1005 may be performed in accordance with examples as disclosed herein. In some examples, aspects of the operations of 1005 may be performed by a rule identifying component 725 as described with reference to FIG. 7.

At 1010, the method may include transmitting one or more control messages scheduling one or more full-duplex communications on a second set of resources that does not overlap with the first set of resources in time or frequency based at least in part on the applicable restricted resource scheduling rule for restricting full-duplex operation on the first set of resources in full-duplex mode. The operations of 1010 may be performed in accordance with examples as disclosed herein. In some examples, aspects of the operations of 1010 may be performed by a control message transmitter 730 as described with reference to FIG. 7.

At 1015, the method may include communicating the one or more full-duplex communications. The operations of 1015 may be performed in accordance with examples as disclosed herein. In some examples, aspects of the operations of 1015 may be performed by a full-duplex communicating component 735 as described with reference to FIG. 7.

Figure 11:
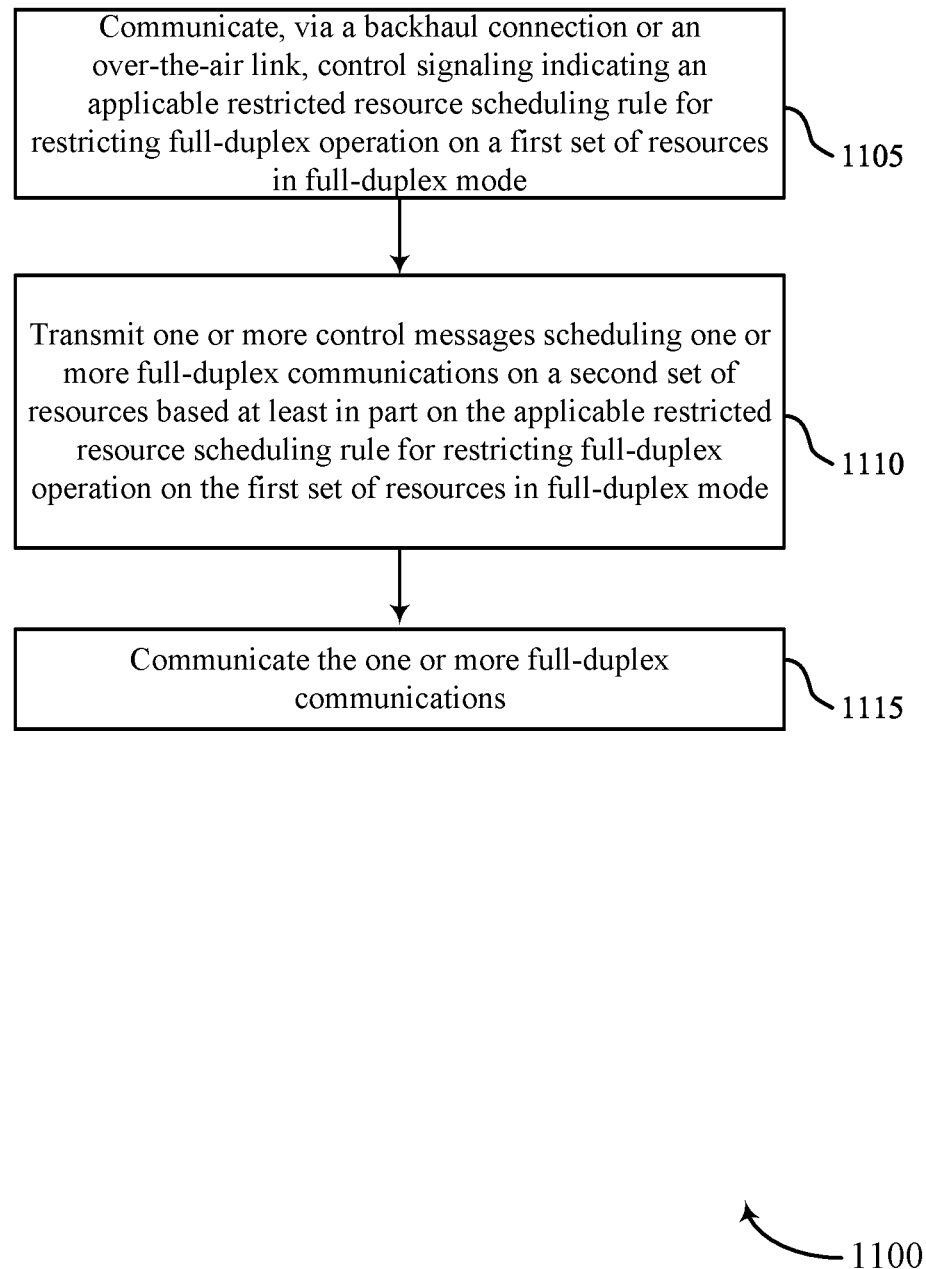

FIG. 11 shows a flowchart illustrating a method 1100 that supports techniques for scheduling full-duplex communications in accordance with aspects of the present disclosure. The operations of the method 1100 may be implemented by a base station or its components as described herein. For example, the operations of the method 1100 may be performed by a base station 105 as described with reference to FIGS. 1 through 8. In some examples, a base station may execute a set of instructions to control the functional elements of the base station to perform the described functions. Additionally or alternatively, the base station may perform aspects of the described functions using special-purpose hardware.

At 1105, the method may include communicating, via a backhaul connection or an over-the-air link, control signaling indicating an applicable restricted resource scheduling rule for restricting full-duplex operation on a first set of resources in full-duplex mode. The operations of 1105 may be performed in accordance with examples as disclosed herein. In some examples, aspects of the operations of 1105 may be performed by a control signaling component 740 as described with reference to FIG. 7.

At 1110, the method may include transmitting one or more control messages scheduling one or more full-duplex communications on a second set of resources based at least in part on the applicable restricted resource scheduling rule for restricting full-duplex operation on the first set of resources in full-duplex mode. The operations of 1110 may be performed in accordance with examples as disclosed herein. In some examples, aspects of the operations of 1110 may be performed by a control message transmitter 730 as described with reference to FIG. 7.

At 1115, the method may include communicating the one or more full-duplex communications. The operations of 1115 may be performed in accordance with examples as disclosed herein. In some examples, aspects of the operations of 1115 may be performed by a full-duplex communicating component 735 as described with reference to FIG. 7.

Figure 12:
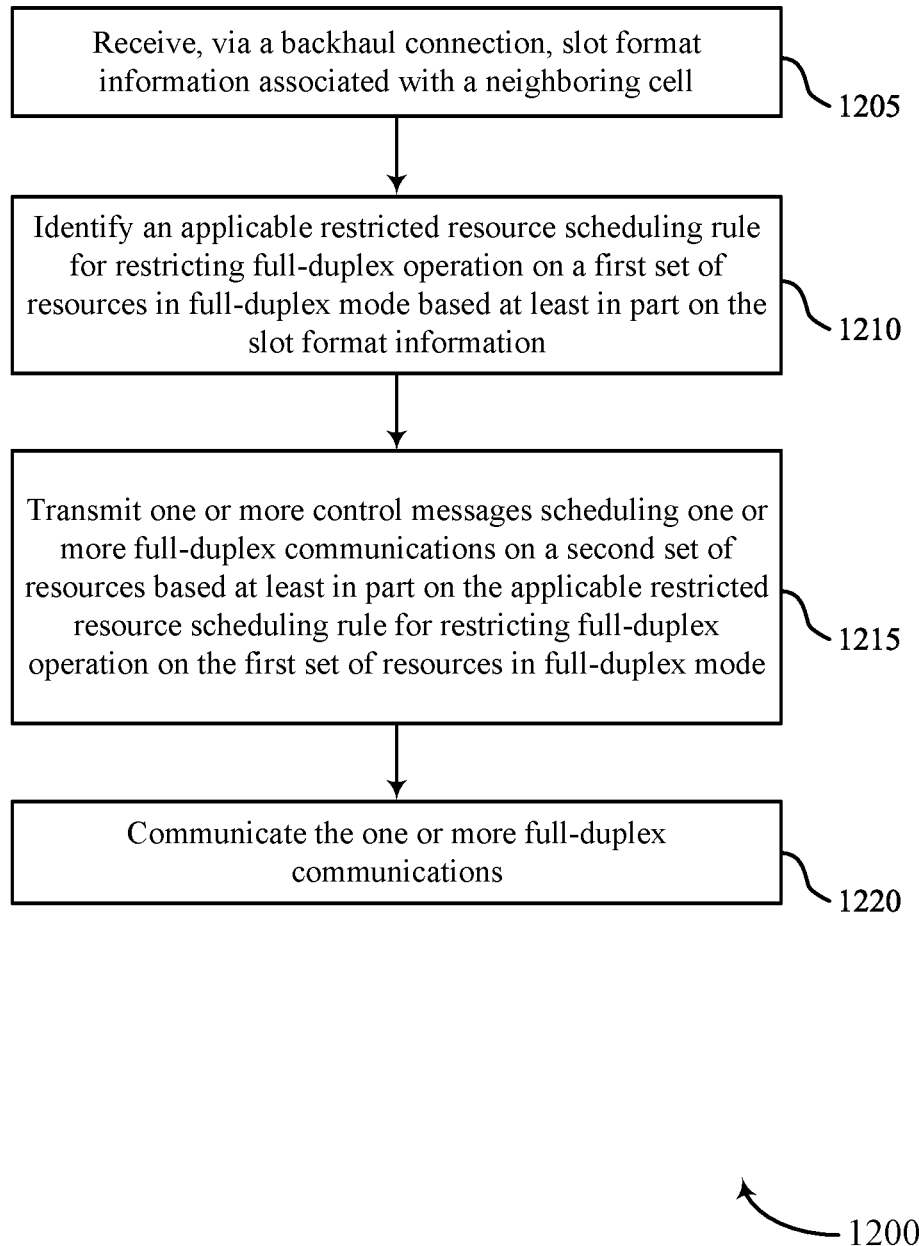

FIG. 12 shows a flowchart illustrating a method 1200 that supports techniques for scheduling full-duplex communications in accordance with aspects of the present disclosure. The operations of the method 1200 may be implemented by a base station or its components as described herein. For example, the operations of the method 1200 may be performed by a base station 105 as described with reference to FIGS. 1 through 8. In some examples, a base station may execute a set of instructions to control the functional elements of the base station to perform the described functions. Additionally or alternatively, the base station may perform aspects of the described functions using special-purpose hardware.

At 1205, the method may include receiving, via a backhaul connection, slot format information associated with a neighboring cell. The operations of 1205 may be performed in accordance with examples as disclosed herein. In some examples, aspects of the operations of 1205 may be performed by an information receiving component 745 as described with reference to FIG. 7.

At 1210, the method may include identifying an applicable restricted resource scheduling rule for restricting full-duplex operation on a first set of resources in full-duplex mode based at least in part on the slot format information. The operations of 1210 may be performed in accordance with examples as disclosed herein. In some examples, aspects of the operations of 1210 may be performed by a rule identifying component 725 as described with reference to FIG. 7.

At 1215, the method may include transmitting one or more control messages scheduling one or more full-duplex communications on a second set of resources based at least in part on the applicable restricted resource scheduling rule for restricting full-duplex operation on the first set of resources in full-duplex mode. The operations of 1215 may be performed in accordance with examples as disclosed herein. In some examples, aspects of the operations of 1215 may be performed by a control message transmitter 730 as described with reference to FIG. 7.

At 1220, the method may include communicating the one or more full-duplex communications. The operations of 1220 may be performed in accordance with examples as disclosed herein. In some examples, aspects of the operations of 1220 may be performed by a full-duplex communicating component 735 as described with reference to FIG. 7.

The following provides an overview of aspects of the present disclosure:

Aspect 1: A method for wireless communications at a base station, comprising: identifying an applicable restricted resource scheduling rule for restricting full-duplex operation on a first set of resources in full-duplex mode; transmitting one or more control messages scheduling one or more full-duplex communications on a second set of resources based at least in part on the applicable restricted resource scheduling rule for restricting full-duplex operation on the first set of resources in full-duplex mode; and communicating the one or more full-duplex communications.

Aspect 2: The method of aspect 1, wherein transmitting the one or more control messages comprises: transmitting the one or more control messages scheduling the one or more full-duplex communications on the second set of resources that does not overlap with the first set of resources in time or frequency.

Aspect 3: The method of any of aspects 1 through 2, wherein transmitting the one or more control messages comprises: transmitting the one or more control messages scheduling the one or more full-duplex communications on the second set of resources that at least partially overlap in time with the first set of resources, wherein a guard band separates the first set of resources from the second set of resources in frequency.

Aspect 4: The method of any of aspects 1 through 3, wherein transmitting the one or more control messages comprises: transmitting the one or more control messages scheduling the one or more full-duplex communications on the second set of resources that is dedicated for full-duplex communications.

Aspect 5: The method of any of aspects 1 through 4, wherein transmitting the one or more control messages comprises: transmitting the one or more control messages scheduling the one or more full-duplex communications on the second set of resources, wherein a defined guard band or a minimum guard band occurs in frequency between the first set of resources and the second set of resources.

Aspect 6: The method of any of aspects 1 through 5, wherein transmitting the one or more control messages comprises: transmitting the one or more control messages scheduling the one or more full-duplex communications on the second set of resources based at least in part on the applicable restricted resource scheduling rule and on a synchronization signal block reference signal received power measurement of a neighboring cell.

Aspect 7: The method of any of aspects 1 through 6, wherein identifying the applicable restricted resource scheduling rule comprises: identifying the applicable restricted resource scheduling rule for restricting full-duplex operation on the first set of resources in full-duplex mode, the first set of resources comprising a common radio resource control downlink symbol, a common radio resource control uplink symbol, a dedicated radio resource control downlink symbol, a dedicated radio resource control uplink symbol, or any combination thereof.

Aspect 8: The method of any of aspects 1 through 7, wherein identifying the applicable restricted resource scheduling rule comprises: identifying the applicable restricted resource scheduling rule for restricting full-duplex operation on the first set of resources in full-duplex mode, the first set of resources comprising a resource associated with a downlink slot format indicator configuration, a resource associated with an uplink slot format indicator configuration, a resource associated with a flexible slot format indicator configuration, or any combination thereof.

Aspect 9: The method of any of aspects 1 through 8, wherein identifying the applicable restricted resource scheduling rule comprises: identifying the applicable restricted resource scheduling rule for restricting full-duplex operation on the first set of resources in full-duplex mode, the first set of resources comprising a resource configured for transmission of a synchronization signal block, a control resource set for a common search space, a downlink shared channel resource configured for transmission of a paging message or remaining minimum system information, a resource configured for a random access occasion, a resource configured for transmission of a beam failure report synchronization signal, a resource configured for transmission of a beam failure report uplink control channel message, a resource configured for transmission of a scheduling request, or any combination thereof.

Aspect 10: The method of any of aspects 1 through 9, wherein identifying the applicable restricted resource scheduling rule comprises: identifying the applicable restricted resource scheduling rule for restricting full-duplex operation on the first set of resources in full-duplex mode, the first set of resources comprising a set of resources associated with a slot pattern, a set of resources associated with a symbol pattern, a set of resources configured for full-duplex communications, a set of resources restricted from full-duplex communications, or any combination thereof.

Aspect 11: The method of any of aspects 1 through 10, further comprising: communicating, via a backhaul connection or an over-the-air link, control signaling indicating the applicable restricted resource scheduling rule, the first set of resources, or both.

Aspect 12: The method of any of aspects 1 through 11, wherein identifying the applicable restricted resource scheduling rule comprises: identifying the applicable restricted resource scheduling rule for restricting full-duplex operation on the first set of resources in full-duplex mode, the first set of resources comprising a set of resources configured for a measurement gap, a set of resources associated with a synchronization signal block-based measurement timing configuration, or both.

Aspect 13: The method of any of aspects 1 through 12, wherein identifying the applicable restricted resource scheduling rule comprises: identifying the applicable restricted resource scheduling rule for restricting full-duplex operation on the first set of resources in full-duplex mode, the first set of resources comprising one or more of a pilot reference signal resource, a beam management reference signal resource, a tracking reference signal resource, a sounding reference signal resource, a channel state information reference signal resource, a phase tracking reference signal resource, or any combination thereof.

Aspect 14: The method of any of aspects 1 through 13, wherein identifying the applicable restricted resource scheduling rule comprises: identifying the applicable restricted resource scheduling rule for restricting full-duplex operation on the first set of resources in full-duplex mode, the first set of resources comprising a set of resources configured for a transmission repetition, a set of resources configured for slot aggregation, or both.

Aspect 15: The method of any of aspects 1 through 14, wherein identifying the applicable restricted resource scheduling rule comprises: identifying the applicable restricted resource scheduling rule for restricting full-duplex operation on the first set of resources in full-duplex mode, the first set of resources comprising a set of resources configured for ultra-reliability low latency communications, a set of resources configured for semi-persistent transmissions, a set of resources allocated by a configured grant, or any combination thereof.

Aspect 16: The method of any of aspects 1 through 15, wherein identifying the applicable restricted resource scheduling rule comprises: identifying the applicable restricted resource scheduling rule for restricting full-duplex operation on the first set of resources in full-duplex mode, the first set of resources comprising an active bandwidth part of a neighboring cell.

Aspect 17: The method of any of aspects 1 through 16, wherein the applicable restricted resource scheduling rule is applicable to the base station, a UE connected to the base station, a neighboring cell, a UE connected to the neighboring cell, or any combination thereof.

Aspect 18: The method of any of aspects 1 through 17, further comprising: receiving, via a backhaul connection, slot format information associated with a neighboring cell, wherein identifying the applicable restricted resource scheduling rule for restricting full-duplex operation on the first set of resources in full-duplex mode is based at least in part on the slot format information.

Aspect 19: The method of any of aspects 1 through 18, wherein the applicable restricted resource scheduling rule comprises a full-duplex communication restriction associated with the first set of resources.

Aspect 20: An apparatus for wireless communications at a base station, comprising a processor and a memory coupled with the processor, where the memory comprises instructions executable by the processor to cause the apparatus to perform a method of any of aspects 1 through 19.

Aspect 21: An apparatus for wireless communications at a base station, comprising at least one means for performing a method of any of aspects 1 through 19.

Aspect 22: A non-transitory computer-readable medium storing code for wireless communications at a base station, wherein the code comprises instructions executable by a processor to perform a method of any of aspects 1 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a base station, comprising:
    identifying an applicable restricted resource scheduling rule for restricting full-duplex operation on a first set of resources in full-duplex mode;
    transmitting one or more control messages scheduling one or more full-duplex communications on a second set of resources based at least in part on the applicable restricted resource scheduling rule for restricting full-duplex operation on the first set of resources in full-duplex mode; and
    communicating the one or more full-duplex communications.

2. The method of claim 1, wherein transmitting the one or more control messages comprises:
    transmitting the one or more control messages scheduling the one or more full-duplex communications on the second set of resources that does not overlap with the first set of resources in time or frequency.

3. The method of claim 1, wherein transmitting the one or more control messages comprises:
    transmitting the one or more control messages scheduling the one or more full-duplex communications on the second set of resources that at least partially overlap in time with the first set of resources, wherein a guard band separates the first set of resources from the second set of resources in frequency.

4. The method of claim 1, wherein transmitting the one or more control messages comprises:
    transmitting the one or more control messages scheduling the one or more full-duplex communications on the second set of resources that is dedicated for full-duplex communications.

5. The method of claim 1, wherein transmitting the one or more control messages comprises:
    transmitting the one or more control messages scheduling the one or more full-duplex communications on the second set of resources, wherein a defined guard band or a minimum guard band occurs in frequency between the first set of resources and the second set of resources.

6. The method of claim 1, wherein transmitting the one or more control messages comprises:
    transmitting the one or more control messages scheduling the one or more full-duplex communications on the second set of resources based at least in part on the applicable restricted resource scheduling rule and on a synchronization signal block reference signal received power measurement of a neighboring cell.

7. The method of claim 1, wherein identifying the applicable restricted resource scheduling rule comprises:
    identifying the applicable restricted resource scheduling rule for restricting full-duplex operation on the first set of resources in full-duplex mode, the first set of resources comprising a common radio resource control downlink symbol, a common radio resource control uplink symbol, a dedicated radio resource control downlink symbol, a dedicated radio resource control uplink symbol, or any combination thereof.

8. The method of claim 1, wherein identifying the applicable restricted resource scheduling rule comprises:
identifying the applicable restricted resource scheduling rule for restricting full-duplex operation on the first set of resources in full-duplex mode, the first set of resources comprising a resource associated with a downlink slot format indicator configuration, a resource associated with an uplink slot format indicator configuration, a resource associated with a flexible slot format indicator configuration, or any combination thereof.

9. The method of claim 1, wherein identifying the applicable restricted resource scheduling rule comprises:
identifying the applicable restricted resource scheduling rule for restricting full-duplex operation on the first set of resources in full-duplex mode, the first set of resources comprising a resource configured for transmission of a synchronization signal block, a control resource set for a common search space, a downlink shared channel resource configured for transmission of a paging message or remaining minimum system information, a resource configured for a random access occasion, a resource configured for transmission of a beam failure report synchronization signal, a resource configured for transmission of a beam failure report uplink control channel message, a resource configured for transmission of a scheduling request, or any combination thereof.

10. The method of claim 1, wherein identifying the applicable restricted resource scheduling rule comprises:
identifying the applicable restricted resource scheduling rule for restricting full-duplex operation on the first set of resources in full-duplex mode, the first set of resources comprising a set of resources associated with a slot pattern, a set of resources associated with a symbol pattern, a set of resources configured for full-duplex communications, a set of resources restricted from full-duplex communications, or any combination thereof.

11. The method of claim 1, further comprising:
communicating, via a backhaul connection or an over-the-air link, control signaling indicating the applicable restricted resource scheduling rule, the first set of resources, or both.

12. The method of claim 1, wherein identifying the applicable restricted resource scheduling rule comprises:
identifying the applicable restricted resource scheduling rule for restricting full-duplex operation on the first set of resources in full-duplex mode, the first set of resources comprising a set of resources configured for a measurement gap, a set of resources associated with a synchronization signal block-based measurement timing configuration, or both.

13. The method of claim 1, wherein identifying the applicable restricted resource scheduling rule comprises:
identifying the applicable restricted resource scheduling rule for restricting full-duplex operation on the first set of resources in full-duplex mode, the first set of resources comprising one or more of a pilot reference signal resource, a beam management reference signal resource, a tracking reference signal resource, a sounding reference signal resource, a channel state information reference signal resource, a phase tracking reference signal resource, or any combination thereof.

14. The method of claim 1, wherein identifying the applicable restricted resource scheduling rule comprises:
identifying the applicable restricted resource scheduling rule for restricting full-duplex operation on the first set of resources in full-duplex mode, the first set of resources comprising a set of resources configured for a transmission repetition, a set of resources configured for slot aggregation, or both.

15. The method of claim 1, wherein identifying the applicable restricted resource scheduling rule comprises:
identifying the applicable restricted resource scheduling rule for restricting full-duplex operation on the first set of resources in full-duplex mode, the first set of resources comprising a set of resources configured for ultra-reliability low latency communications, a set of resources configured for semi-persistent transmissions, a set of resources allocated by a configured grant, or any combination thereof.

16. The method of claim 1, wherein identifying the applicable restricted resource scheduling rule comprises:
identifying the applicable restricted resource scheduling rule for restricting full-duplex operation on the first set of resources in full-duplex mode, the first set of resources comprising an active bandwidth part of a neighboring cell.

17. The method of claim 1, wherein the applicable restricted resource scheduling rule is applicable to the base station, a user equipment (UE) connected to the base station, a neighboring cell, a UE connected to the neighboring cell, or any combination thereof.

18. The method of claim 1, further comprising:
receiving, via a backhaul connection, slot format information associated with a neighboring cell, wherein identifying the applicable restricted resource scheduling rule for restricting full-duplex operation on the first set of resources in full-duplex mode is based at least in part on the slot format information.

19. The method of claim 1, wherein the applicable restricted resource scheduling rule comprises a full-duplex communication restriction associated with the first set of resources.

20. An apparatus for wireless communications at a base station, comprising:
a processor; and
a memory coupled with the processor, wherein the memory comprises instructions executable by the processor to cause the apparatus to:
identify an applicable restricted resource scheduling rule for restricting full-duplex operation on a first set of resources in full-duplex mode;
transmit one or more control messages scheduling one or more full-duplex communications on a second set of resources based at least in part on the applicable restricted resource scheduling rule for restricting full-duplex operation on the first set of resources in full-duplex mode; and
communicate the one or more full-duplex communications.

21. The apparatus of claim 20, wherein the instructions to transmit the one or more control messages are executable by the processor to cause the apparatus to:
transmit the one or more control messages scheduling the one or more full-duplex communications on the second set of resources that does not overlap with the first set of resources in time or frequency.

22. The apparatus of claim 20, wherein the instructions to transmit the one or more control messages are executable by the processor to cause the apparatus to:
transmit the one or more control messages scheduling the one or more full-duplex communications on the second set of resources that at least partially overlap in time with the first set of resources, wherein a guard band separates the first set of resources from the second set of resources in frequency.

23. The apparatus of claim 20, wherein the instructions to transmit the one or more control messages are executable by the processor to cause the apparatus to:
transmit the one or more control messages scheduling the one or more full-duplex communications on the second set of resources that is dedicated for full-duplex communications.

24. The apparatus of claim 20, wherein the instructions to transmit the one or more control messages are executable by the processor to cause the apparatus to:
transmit the one or more control messages scheduling the one or more full-duplex communications on the second set of resources, wherein a defined guard band or a minimum guard band occurs in frequency between the first set of resources and the second set of resources.

25. The apparatus of claim 20, wherein the instructions to transmit the one or more control messages are executable by the processor to cause the apparatus to:
transmit the one or more control messages scheduling the one or more full-duplex communications on the second set of resources based at least in part on the applicable restricted resource scheduling rule and on a synchronization signal block reference signal received power measurement of a neighboring cell.

26. The apparatus of claim 20, wherein the instructions to identify the applicable restricted resource scheduling rule are executable by the processor to cause the apparatus to:
identify the applicable restricted resource scheduling rule for restricting full-duplex operation on the first set of resources in full-duplex mode, the first set of resources comprising a common radio resource control downlink symbol, a common radio resource control uplink symbol, a dedicated radio resource control downlink symbol, a dedicated radio resource control uplink symbol, or any combination thereof.

27. The apparatus of claim 20, wherein the instructions to identify the applicable restricted resource scheduling rule are executable by the processor to cause the apparatus to:
identify the applicable restricted resource scheduling rule for restricting full-duplex operation on the first set of resources in full-duplex mode, the first set of resources comprising a resource associated with a downlink slot format indicator configuration, a resource associated with an uplink slot format indicator configuration, a resource associated with a flexible slot format indicator configuration, or any combination thereof.

28. The apparatus of claim 20, wherein the instructions to identify the applicable restricted resource scheduling rule are executable by the processor to cause the apparatus to:
identify the applicable restricted resource scheduling rule for restricting full-duplex operation on the first set of resources in full-duplex mode, the first set of resources comprising a resource configured for transmission of a synchronization signal block, a control resource set for a common search space, a downlink shared channel resource configured for transmission of a paging message or remaining minimum system information, a resource configured for a random access occasion, a resource configured for transmission of a beam failure report synchronization signal, a resource configured for transmission of a beam failure report uplink control channel message, a resource configured for transmission of a scheduling request, or any combination thereof.

29. An apparatus for wireless communications at a base station, comprising:
means for identifying an applicable restricted resource scheduling rule for restricting full-duplex operation on a first set of resources in full-duplex mode;
means for transmitting one or more control messages scheduling one or more full-duplex communications on a second set of resources based at least in part on the applicable restricted resource scheduling rule for restricting full-duplex operation on the first set of resources in full-duplex mode; and
means for communicating the one or more full-duplex communications.

30. A non-transitory computer-readable medium storing code for wireless communications at a base station, wherein the code comprises instructions executable by a processor to:
identify an applicable restricted resource scheduling rule for restricting full-duplex operation on a first set of resources in full-duplex mode;
transmit one or more control messages scheduling one or more full-duplex communications on a second set of resources based at least in part on the applicable restricted resource scheduling rule for restricting full-duplex operation on the first set of resources in full-duplex mode; and
communicate the one or more full-duplex communications.

* * * * *